(12) United States Patent
Friedman et al.

(10) Patent No.: US 12,375,407 B2
(45) Date of Patent: Jul. 29, 2025

(54) COMBINED CONGESTION CONTROL AND LOAD BALANCING

(71) Applicant: Mellanox Technologies, Ltd., Yokneam (IL)

(72) Inventors: Yamin Friedman, Jerusalem (IL); Omer Shabtai, Tel Aviv (IL); Yuval Shpigelman, Netanya (IL); Rotem Levinson, Haifa (IL)

(73) Assignee: Mellanox Technologies, Ltd., Yokneam (IL)

( * ) Notice: Subject to any disclaimer, the term of this patent is extended or adjusted under 35 U.S.C. 154(b) by 161 days.

(21) Appl. No.: 18/201,074

(22) Filed: May 23, 2023

(65) Prior Publication Data

US 2024/0396839 A1    Nov. 28, 2024

(51) Int. Cl.
  *G06F 15/173*    (2006.01)
  *H04L 47/125*    (2022.01)
(52) U.S. Cl.
  CPC ................... *H04L 47/125* (2013.01)
(58) Field of Classification Search
  CPC .............. H04L 47/125; H04L 47/11
  See application file for complete search history.

(56) References Cited

U.S. PATENT DOCUMENTS

| | | | |
|---|---|---|---|
| 11,088,966 B2 | 8/2021 | Menachem | |
| 2015/0127797 A1 | 5/2015 | Attar et al. | |
| 2015/0207719 A1* | 7/2015 | Chakhaiyar | H04L 49/602 370/252 |
| 2017/0324664 A1 | 11/2017 | Xu et al. | |
| 2019/0190833 A1 | 6/2019 | Georgios et al. | |
| 2019/0386924 A1 | 12/2019 | Srinivasan et al. | |
| 2020/0236052 A1 | 7/2020 | Srinivasan et al. | |
| 2022/0239594 A1* | 7/2022 | Ramakrishnan | H04L 49/501 |

OTHER PUBLICATIONS

Extended European Search Report for European Application No. 24177785.3, mailed Oct. 29, 2024, 06 Pages.

* cited by examiner

*Primary Examiner* — Padma Mundur
(74) *Attorney, Agent, or Firm* — Lowenstein Sandler LLP

(57) ABSTRACT

Technologies for optimizing the spreading of traffic across multiple local output ports while considering both local load and end-to-end (E2E) load are described. One device has multiple outgoing ports and a network adapter that determines, for a first flow of packets, a first end-to-end (E2E) congestion rate of at least some of the outgoing ports. The network adapter determines a port state of at least some of the outgoing ports. The network adapter receives a first packet associated with the first flow of packets. The network adapter determines, using a first desired rate for the first flow, the first E2E congestion rates, and the port states, i) a first time at which the first packet is to be transmitted and ii) a first outgoing port on which the first packet is to be transmitted. The first packet is sent on the first outgoing port at the first time.

20 Claims, 10 Drawing Sheets

COMBINED CONGESTION CONTROL AND LOAD BALANCING

TECHNICAL FIELD

At least one embodiment pertains to processing resources used to perform and facilitate network communications. For example, at least one embodiment pertains to combined congestion control and load balancing, and more specifically, optimizing the spreading of traffic across multiple local output ports while considering both local load and end-to-end (E2E) load.

BACKGROUND

In networking, there is generally a desire to control packet scheduling and routing so as not to oversubscribe certain links in a network. Flows of packets over links between devices can be affected by a load on the local output ports of a sender device and a load on links somewhere in the network between the sender device and a receiver device. Conventionally, congestion control algorithms on devices are concerned with managing traffic flow traversing one or more routes from one endpoint device to another and deciding the correct rate at which packets should be sent. Conventionally, load balancing is done by a switch trying to spread traffic across multiple routes. Switches, however, do not control when packets arrive on one of the ports, and a load balancing algorithm on the switch is only concerned with the optimal egress port for the packet and not whether that packet should be sent.

BRIEF DESCRIPTION OF THE SEVERAL VIEWS OF THE DRAWINGS

Various embodiments in accordance with the present disclosure will be described with reference to the drawings, in which.

DETAILED DESCRIPTION

Figure 1:
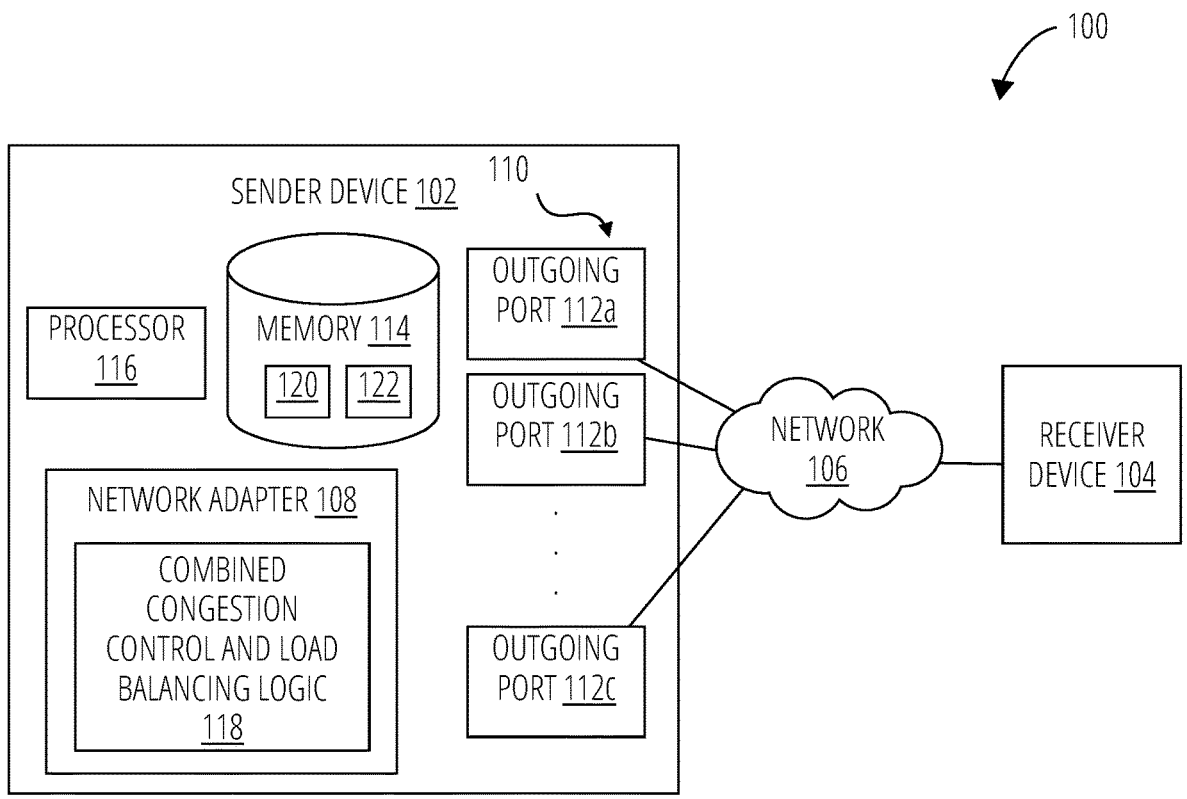
FIG. 1 is a block diagram of a sender device with combined congestion control and load balancing logic according to at least one embodiment.

Technologies for optimizing the spreading of traffic across multiple local output ports while considering both local load and end-to-end (E2E) load are described. As described above, conventional congestion control algorithms manage traffic flow traversing one or more routes from one endpoint device to another and deciding the correct rate at which packets should be sent. Convention congestion control algorithms are designed to take a traffic flow that is traveling on one or more routes from one endpoint device to another and to decide the correct rate at which packets should be sent to utilize as much of the capacity of links along the way without causing any build-up of packets within the network. This is usually done by limiting the number of in-flight packets or pacing the packet transmission rate. Also, as described above, the load balancing done by a switch spreads traffic across multiple routes by selecting the optimal egress port for an incoming packet. However, a conventional load balancing algorithm on a switch does not control when packets arrive on one of the ingress ports and does not determine whether a particular packet should be sent.

Aspects and embodiments of the present disclosure address these and other challenges by providing a mechanism that combines congestion control and load balancing. The Aspects and embodiments of the present disclosure can optimally spread traffic across multiple local output ports while considering both local load and E2E load. Aspects and embodiments of the present disclosure can improve network utilization by spreading the transport flow across multiple network paths while considering the local load on the outgoing ports. Aspects and embodiments of the present disclosure can be implemented in a device that transmits packets for one or more flows and has multiple egress ports. Aspects and embodiments of the present disclosure can determine when a specific flow should transmit a packet and which egress port to use to optimize a total output bandwidth. Instead of having two discrete functions of congestion control to determine when to transmit and load balancing to determine the egress port, aspects and embodiments of the present disclosure use a combined mechanism. Aspects and embodiments of the present disclosure can use E2E congestion rate limiting as a parameter for local load balancing to better adjust the selection of output pots so that packets can be sent on less congested routes and outgoing traffic can be spread across multiple local port options. The E2E congestion control rates can be used to select either a set of possible output ports or can be taken into account in more complex load balancing schemes, as described herein.

Aspects and embodiments of the present disclosure can enable software to load different network routing identifiers for a specific transport flow, and the hardware can use these network routing identifiers while sending traffic to send packets across all of the given network paths at a finer granularity. Aspects and embodiments of the present disclosure can enable hardware to send packets with different routing parameters without software intervention in the data path. Aspects and embodiments of the present disclosure can enable spreading traffic for a single transport flow on multiple routes transparently to an application. Aspects and embodiments of the present disclosure can monitor individual routes and identify which routers are more or less congested. Aspects and embodiments of the present disclosure can provide a fast recovery mechanism in the case of a transport error.

Aspects and embodiments of the present disclosure are relevant for any networks that provide multiple routes between any two end nodes. One example use case includes a network where the end nodes have a higher aggregate bandwidth than individual links in the network. Another use case example includes a network with static routing that may have congestion caused by unlucky application interaction. Another use case is where applications are very sensitive to tail latencies caused during an error event.

Aspects and embodiments of the present disclosure can be used in channel adapters, network adapters, network interface cards (NICs), or the like. A channel adapter (CA), whether a network channel adapter or a host channel adapter, refers to an end node in an InfiniBand Network with features for InfiniBand and RDMA, whereas a network interface card (NIC) is similar but for an Ethernet network. Network interface controller, also known as a network interface card (NIC), network adapter, local area network (LAN) adapter, or physical network interface, refers to a computer hardware component that connects a computer to a computer network. The network interface controller can provide interfaces to a host processor, multiple receive and transmit queues for multiple logical interfaces and traffic processing. The network interface controller can be both a physical layer and data link layer device, as it provides physical access to a networking medium and a low-level addressing system through the use of media access control (MAC) addresses that are uniquely assigned to network interfaces. The technologies described herein can be implemented in these various types of devices and are referred to herein as "network interface controllers" or "network controllers." That is, the network interface controller can be a channel adapter, a NIC, a network adapter, or the like. The network interface controller can be implemented in a personal computer (PC), a set-top box (STB), a server, a network router, a switch, a bridge, a data processing unit (DPU), a network card, or any device capable of sending packets over multiple network paths to another device.

FIG. 1 is a block diagram of a sender device 102 with combined congestion control and load balancing logic 118 according to at least one embodiment. A network architecture 100 includes the sender device 102 and a receiver device 104, communicatively coupled over a network 106. Network 106 can be a public network (e.g., the Internet), a private network (e.g., a local area network (LAN), or wide area network (WAN)), a wireless network, a personal area network (PAN), or a combination thereof. The sender device 102 (also referred to as a requestor device) includes a network adapter 108 capable of spreading one or more transport flows across multiple network paths in the network 106 to the receiver device 104. The sender device 102 can support one or more applications (not explicitly shown in FIG. 1) that can manage various processes that control data communication with various target devices, including target memory.

Operation of sender device 102 and receiver device 104 can be supported by respective processors, such as processor 116 at the sender device 102, which can include one or more processing devices, such as CPUs, graphics processing units (GPUs), application-specific integrated circuits (ASICs), field-programmable gate arrays (FPGAs), or any combination thereof. In some embodiments, any of processor 116, network adapter 108, the memory 114 can be implemented using an integrated circuit, e.g., a system-on-chip. Similarly, components of the receiver device 104 can be implemented on a single chip. The sender device 102 can be implemented in a personal computer (PC), a set-top box (STB), a server, a network router, a switch, a bridge, a data processing unit (DPU), a network card, or any device capable of sending packets over multiple network paths to another device.

In at least one embodiment, to facilitate memory transfers, processes can post work requests (WRs) to a send queue (SQ) and a receive queue (RQ). SQ can be used to request one-sided READ, WRITE, and ATOMIC operations and two-sided SEND operations, while RQ can be used to facilitate two-sided RECEIVE requests. Similar processes can operate on receiver device 104, supporting its own SQ and RQ. A connection between sender device 102 and receiver device 104 can bundle SQs and RQs into queue pairs (QPs). More specifically, the processes can create and link one or more queue pairs to initiate a connection between sender device 102 and receiver device 104.

In at least one embodiment, to perform a data transfer, a process creates a work queue element (WQE) that specifies parameters such as the RDMA verb (operation) to be used for data communication and also can define various operation parameters, such as a source address in a requestor memory (where the data is currently stored), a destination address in a target memory, and other parameters, as discussed in more detail below. The sender device 102 can then put the WQE into SQ and send a WR to the network adapter 108 (e.g., a first network controller), which can use an RDMA adapter to perform packet processing of the WQE and transmit the data indicated in the source address to a second network adapter at the receiver device 104 (e.g., a second network controller) via network 106 using a network request. For example, an RDMA adapter can perform packet processing of the received network request (e.g., by generating a local request) and store the data at a destination address of the target memory. Subsequently, receiver device 104 can signal the completion of the data transfer by placing a completion event into a completion queue (CQ) of the sender device 102, indicating that the WQE has been processed by the receiving side. The receiver device 104 can also maintain CQ to receive completion messages from sender device 102 when data transfers happen in the opposite direction, from receiver device 104 to sender device 102. RDMA accesses to requestor memory and/or target memory can be performed via network 106, a local bus on the requestor side, and a local bus on the target side and can be enabled by the Converged Ethernet (RoCE) protocol, iWARP protocol, and/or InfiniBand™, TCP, and the like.

As disclosed in more detail below, the combined congestion control and load balancing logic 118 can spread a transport flow across multiple paths in the network 106 using flow CC information 120 and egress port states 122 of the outgoing ports 110. The flow CC information 120 and egress port states 122 can be stored in memory 114, cache, or storage in the sender device 102 or the network adapter 108. The flow CC information 120 can include an E2E congestion rate per each route/path to the receiver device 104. While sending traffic on each route, Round Trip Time (RTT) can be measured by combined congestion control and load balancing logic 118, and those measurements can be used to adjust the weights for the different routes to identify which are more or less congested. RTT is the length of time it takes for a data packet to be sent to a destination, plus the time it takes for an acknowledgment of that packet to be received back at the origin. The RTT measurements can generate the flow CC information 120 used by the combined congestion control and load balancing logic 118 to optimally utilize multiple routes to the same destination. The combined congestion control and load balancing logic 118 also uses egress port states 122 when making decisions. The egress port states 122 can include an egress port state for each of the multiple outgoing ports 110. In at least one embodiment, different routes/network paths to the same destination endpoint can be defined as session sessions in a session group. For example, three network paths to a destination endpoint would have three sessions in a session group. There can be some translation between sessions to a certain destination and the parameters that will be set in the wire protocol headers. After a QP sends a burst of data, it may decide, based on certain parameters, that the next burst will be sent in a different route. When the QP is scheduled again to send a burst, the QP can select one of the routes provided by the combined congestion control and load balancing logic 118 based on their relative weights, as described in more detail below.

The network adapter 108 can spread a transport flow across multiple paths in the network 106 while maintaining congestion control at an endpoint using the flow CC information 120 and egress port states 122. The network adapter 108 can improve network utilization by spreading the transport flow across multiple network paths. The network adapter 108 can enable software to load different network routing identifiers for a specific transport flow, and the hardware can use these network routing identifiers while sending traffic to send packets across all of the given network paths at a finer granularity. Network routing identifiers refer to a value that is part of a packet header field (also referred to as a header field in wire protocol headers). The network adapter 108 can enable hardware to send packets with multiple different routing parameters without software intervention in the data path. The network adapter 108 can enable spreading traffic for a single transport flow on multiple routes transparently to the process (e.g., an application). The network adapter 108 can monitor individual routes and identify which routes are more or less congested. The network adapter 108 can monitor individual outgoing ports 110 and identify which outgoing ports 110 are more or less congested. The network adapter 108 can provide a fast recovery mechanism in the case of a transport error. The receiver device 104 can perform similar functions.

In at least one embodiment, the network adapter 108 and processor 116 can be part of a first node, and a network adapter and processor of the receiver device 104 can be part of a second node. There can be multiple intervening nodes between the first node and the second node. At a minimum, at least two paths should be between the first node and the second node.

In at least one embodiment, the network adapter 108 can determine, for a first flow of packets, a first E2E congestion rate of at least a portion of the outgoing ports 110. For example, the network adapter 108 can determine a first E2E congestion rate for a first outgoing port 112*a*, a first E2E congestion rate for a second outgoing port 112*b*, and a first E2E congestion rate for an Nth outgoing port 112*c*, where N is an integer number of outgoing ports 110 of sender device 102. The network adapter 108 can determine a port state of at least a portion of the outgoing ports 110. For example, the network adapter 108 can determine a port state for each outgoing port 110. The port state can represent a congestion level of the individual outgoing port. The port state can include a buffer state of one or more buffers associated with the respective outgoing port. The port state can include one or more local metrics or states of one or more hardware resources allocated or otherwise associated with the respective outgoing port. In at least one embodiment, the port state can include one or more of the following: a number of outstanding packets in one or more allocated buffers associated with the corresponding outgoing port, a transmission rate of the corresponding outgoing port over a period, a number of the one or more allocated buffers associated with the corresponding outgoing port, a state of the one or more allocated buffers associated with the corresponding outgoing port, or the like.

During operation, the network adapter 108 can identify a first desired rate for the first flow of packets. In some cases, the first desired rate is received as an input parameter. For example, the combined congestion control and load balancing logic 118 can receive the first desired rate from a congestion control algorithm. The network adapter 108 can receive a first packet associated with the first flow of packets. The network adapter 108 can determine, using the first desired rate, the first E2E congestion rates, and the port states, i) a first time at which the first packet is to be transmitted and ii) a first outgoing port (e.g., a first outgoing port 112*a*) of the outgoing ports 110 on which the first packet is to be transmitted. The network adapter 108 sends, at the first time, the first packet on the first outgoing port. In at least one embodiment, the network adapter 108 can determine, for at least a portion of the outgoing ports 110, a score using the respective port state and the respective first E2E congestion rate. The network adapter 108 can determine a subset of the outgoing ports 110, each outgoing port of the subset having a score that satisfies a threshold criterion. The network adapter 108 can determine that the first outgoing port (e.g., first outgoing port 112*a*) satisfies a scoring criterion relative to the other outgoing ports in the subset of the outgoing ports 110. In at least one embodiment, the scoring criterion can be the lowest score in the subset. For example, the first outgoing port can be selected because it has the lowest score or at least has a lower score than other outgoing ports in the subset. Alternatively, other scoring criteria can be used, such as the highest score when a higher score represents less congestion.

In a further embodiment, for a second flow of packets, the network adapter 108 can determine a second E2E congestion rate of at least a portion of the outgoing ports 110. The network adapter 108 can identify a second desired rate for the second flow of packets. The network adapter 108 can receive a second packet associated with the second flow of packets. The network adapter 108 can determine, using the second desired rate, the second E2E congestion rates, and the port states, i) a second time at which the second packet is to be transmitted and ii) a second outgoing port (e.g., a second outgoing port 112*b*) of the outgoing ports 110 on which the second packet is to be transmitted. The network adapter 108 can send, at the second time, the second packet on the second outgoing port. In at least one embodiment, the network adapter 108 can determine, for at least a portion of the outgoing ports 110, a score using the respective port state and the respective second E2E congestion rate. The network adapter 108 can determine a subset of the outgoing ports 110, each outgoing port of the subset having a score that satisfies a threshold criterion. The network adapter 108 can determine that the second outgoing port (e.g., second outgoing port 112*b*) satisfies a scoring criterion (e.g., lowest score) relative to the other outgoing ports in the subset of the outgoing ports 110. It should be noted that the first and second outgoing ports, as determined by the network adapter 108, can be the same physical outgoing port, such as the first outgoing port 112*a*.

In at least one embodiment, the network adapter 108 can determine i) the first time and ii) the first outgoing port, by determining a first score for the first outgoing port (e.g., outgoing port 112a) using a first state of the first outgoing port and the first E2E congestion rate of the first outgoing port. The network adapter 108 can determine a second score for a second outgoing port (e.g., outgoing port 112b) using a second state of the second outgoing port and the second E2E congestion rate of the second outgoing port. The network adapter 108 can determine that the first and second scores satisfy a threshold criterion. The network adapter 108 can determine that the first score is less than the second score. In this manner, the network adapter 108 can select ii) the first outgoing port to transmit the first packet at the first time. In at least one embodiment, the network adapter 108 can determine i) the second time and ii) the second outgoing port, by determining a third score for the first outgoing port (e.g., outgoing port 112a) using the first state of the first outgoing port and the second E2E congestion rate of the first outgoing port. The network adapter 108 can determine a fourth score for the second outgoing port (e.g., outgoing port 112b) using the second state of the second outgoing port and the second E2E congestion rate of the second outgoing port. The network adapter 108 can determine whether the second packet is to be transmitted on the second outgoing port based on the fourth score being less than the third score. In this manner, the network adapter 108 can select ii) the second outgoing port to transmit the second packet at the second time.

In at least one embodiment, the operations of the network adapter 108 described above can be performed by the combined congestion control and load balancing logic 118. Additional details of the combined congestion control and load balancing logic 118 are described below with respect to FIG. 2.

Figure 2:
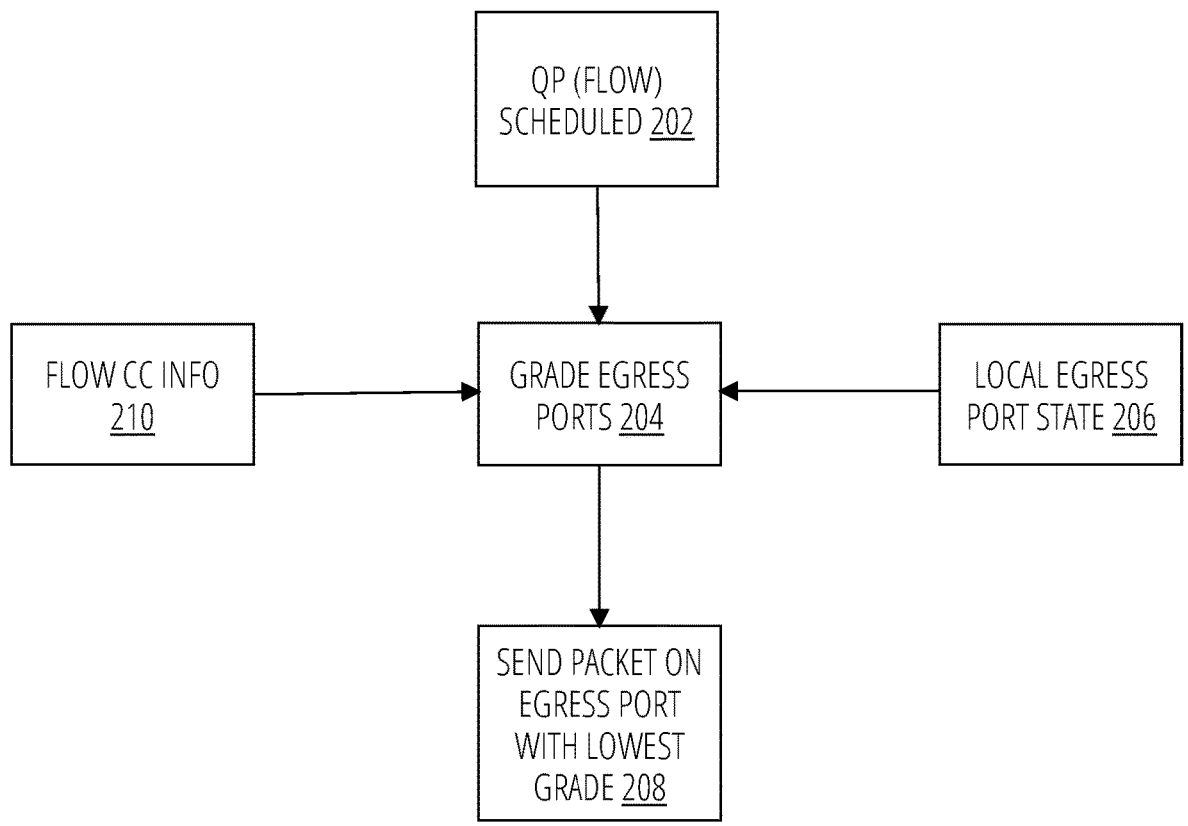
FIG. 2 is a flow diagram of combined congestion control and load balancing logic according to at least one embodiment.

FIG. 2 is a flow diagram of combined congestion control and load balancing logic 200 according to at least one embodiment. The combined congestion control and load balancing logic 200 is similar to the combined congestion control and load balancing logic 118 of FIG. 1. The combined congestion control and load balancing logic 200 can include hardware, software, firmware, or any combination thereof. The combined congestion control and load balancing logic 200 can identify a flow of packets that is scheduled for transmission. The scheduled flow of packets can be associated with a queue pair (QP) or a send queue (SQ). The combined congestion control and load balancing logic 200 can receive, as inputs, a packet 202 from the scheduled flow of packets, flow congestion control (CC) information 210, and local egress port state 206. The flow CC information 210 can include an E2E congestion rate for each outgoing port (or at least a portion of the outgoing ports). The local egress port state information 206 can include a port state for each outgoing port (or at least a portion of the outgoing ports). The port state can include a number of outstanding packets in one or more allocated buffers associated with the corresponding outgoing port. The port state can include a transmission rate of the corresponding outgoing port over a period. The port state can include a number of the one or more allocated buffers associated with the corresponding outgoing port. The port state can include a state of the one or more allocated buffers associated with the corresponding outgoing port. The combined congestion control and load balancing logic 200 can grade or score each egress port at block 204 based on the inputs. In particular, the combined congestion control and load balancing logic 200 can determine which egress port has the best score or grade (e.g., lowest score or highest grade) for sending the packet. The combined congestion control and load balancing logic 200 can select the egress port with the best score for sending the packet (block 208). The combined congestion control and load balancing logic 200 can cause the packet to be sent on the selected egress port with the best score. In at least one embodiment, the combined congestion control and load balancing logic 200 can continue to send packets of the scheduled flow of packets on the selected egress point. In another embodiment, the combined congestion control and load balancing logic 200 can determine whether to continue sending packets on the selected egress point on a per-packet basis.

In another embodiment, the combined congestion control and load balancing logic 200 can receive a first packet, associated with a first flow of packets, and determine a first outgoing port (egress port) based on the flow CC information 210 and local egress port state information 206. The combined congestion control and load balancing logic 200 can receive a second packet, associated with a second flow of packets, and determine a second outgoing port (egress port) based on the flow CC information 210 and local egress port state information 206. The flow CC information 210 can include different E2E congestion rates for the first flow of packets and the second flow of packets. The local egress port state information 206 could be the same for both flows unless there has been an update to the egress port states. In this manner, the combined congestion control and load balancing logic 200 can determine a best egress port (i.e., the egress port with the best score) for each of the different flows of packets based on the different E2E congestion rates for the different flows and the current state of the egress ports.

In at least one embodiment, the combined congestion control and load balancing logic 200 determine, for at least a portion of the egress ports, a score using the respective port state of local egress port state information 206 and the respective first E2E congestion rate of flow CC information 210. The combined congestion control and load balancing logic 200 can obtain a subset of egress ports with a score that satisfies a threshold criterion. The threshold criterion can represent a maximum score for an egress port to be considered for load balancing. That is, some ports can be so congested that they have a high score that would preclude them from consideration for load balancing purposes. The combined congestion control and load balancing logic 200 can determine the subset where each egress port of the subset has a score that satisfies the threshold criterion. The combined congestion control and load balancing logic 200 can select the egress port from the subset that satisfies a scoring criterion relative to the other egress ports of the subset. For example, the scoring criterion can be a lowest score, where the lower scores are better than higher scores. The combined congestion control and load balancing logic 200 can select the egress port with the lowest score in the subset or at least one of the egress ports having a score that is less than the scores of others in the subset.

In at least one embodiment, the combined congestion control and load balancing logic 200 can calculate the grades/scores of the egress ports based on a desired rate for a given flow of packets, the E2E congestion rates per port, and parameters of the port state (e.g., buffer state parameters). For example, when opening a new connection (or sending an unordered packet), the 200 can check all available outgoing ports (e.g., all planes the congestion control algorithm allows sending packets on). For a new DC connection, this could be all outgoing ports (all planes). For each outgoing port (plane), the combined congestion control and load balancing logic 200 calculates a score using the following equation as follows:

$$s_i = \sum \alpha * P_i,$$

where $P_i$ is a parameter for a given port, i, and alpha is a global value per parameter. The outgoing ports can be graded/scored based on threshold values. The combined congestion control and load balancing logic 200 can select an outgoing port (plane) randomly, round robin, or last used from outgoing ports (planes) with minimal grades within the threshold values and allowed by the congestion control algorithm.

In the embodiments of FIG. 2, the flow CC information 210 is used as a generic input to the grading/score of the egress ports. In other embodiments, the flow CC information 210 and the local egress port state information 206 can be weighted for selecting an egress port with the best score, as illustrated in FIG. 3.

Figure 3:
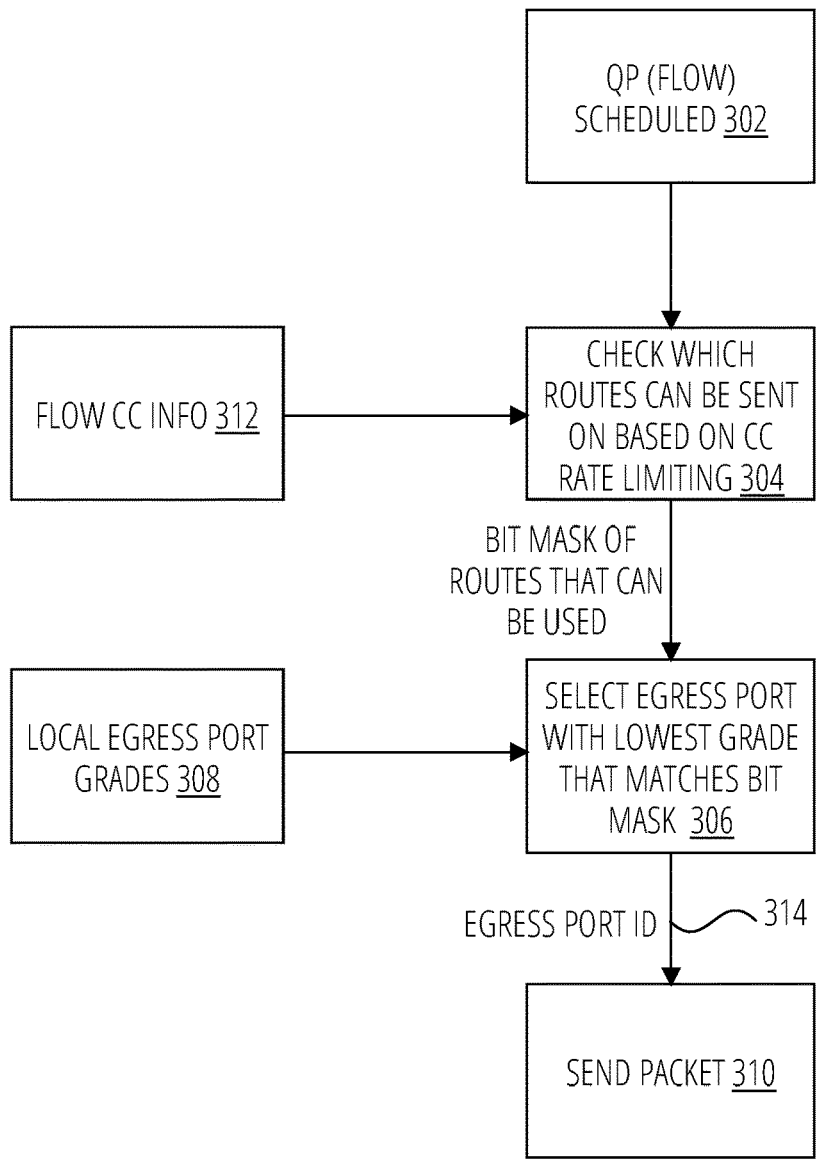
FIG. 3 is a flow diagram of combined congestion control and load balancing logic according to at least one embodiment.

FIG. 3 is a flow diagram of combined congestion control and load balancing logic 300 according to at least one embodiment. The combined congestion control and load balancing logic 300 is similar to the combined congestion control and load balancing logic 118 of FIG. 1. The combined congestion control and load balancing logic 300 can include hardware, software, firmware, or any combination thereof. The combined congestion control and load balancing logic 300 can identify a flow of packets that is scheduled for transmission. The scheduled flow of packets can be associated with a queue pair (QP) or a send queue (SQ). The combined congestion control and load balancing logic 300 can receive, as inputs, a packet 302 from the scheduled flow of packets, flow congestion control (CC) information 312, and local egress port grades 308. The flow CC information 312 can include an E2E congestion rate for each outgoing port (or at least a portion of the outgoing ports). The local egress port grades 308 can include a grade or a score for each outgoing port (or at least a portion of the outgoing ports). The grade or score can be derived from the port state described above. The combined congestion control and load balancing logic 300 can grade or score each of the egress ports in a similar manner as described above with respect to block 204, except that it is not based on the flow CC information 312. The combined congestion control and load balancing logic 300 can check which routes the packet can be sent on based on the flow CC information 312. The combined congestion control and load balancing logic 300 can generate a bit mask of routes that can be used (block 304). The combined congestion control and load balancing logic 300 can select an egress port with a best grade/score, from the local egress port grades 308, that matches the bit mask from block 304. The combined congestion control and load balancing logic 300 can provide an egress port identifier (ID) egress port identifier 314 (egress port ID) for the selected egress port. The packet can be sent on the egress port corresponding to the egress port identifier 314 (block 310). That is, the combined congestion control and load balancing logic 300 can cause the packet 302 to be sent on the selected egress port with the best score, but that also matches the bit mask. In at least one embodiment, the combined congestion control and load balancing logic 300 can continue to send packets of the scheduled flow of packets on the selected egress point. In another embodiment, the combined congestion control and load balancing logic 300 can determine whether to continue sending packets on the selected egress point on a per-packet basis.

In another embodiment, the combined congestion control and load balancing logic 300 can receive a first packet, associated with a first flow of packets, and determine a set of outgoing ports based on the flow CC information 312. The combined congestion control and load balancing logic 300 can score each outgoing port and then select one of the outgoing ports in the set based on the local egress port grades 308. The combined congestion control and load balancing logic 300 can receive a second packet, associated with a second flow of packets, and determine a second set of outgoing ports based on the flow CC information 312. The combined congestion control and load balancing logic 300 can score each outgoing port and select one of the outgoing ports in the second set based on the local egress port grades 308. The flow CC information 312 can include different E2E congestion rates for the first flow of packets and the second flow of packets. The local egress port grades 308 could be the same for both flows unless there has been an update to the egress port states. In this manner, the combined congestion control and load balancing logic 300 can determine a best egress port (i.e., the egress port with the best score) for each of the different flows of packets based on the different E2E congestion rates for the different flows and the current state of the egress ports, as reflected in the local egress port grades 308.

In at least one embodiment, the combined congestion control and load balancing logic 300 determine a score using the respective port state for at least a portion of the egress ports. The combined congestion control and load balancing logic 300 can determine the respective first E2E congestion rate of flow CC information 312. The combined congestion control and load balancing logic 300 can obtain a subset of egress ports with an E2E congestion rate that satisfies a threshold criterion. The threshold criterion can represent a minimum E2E congestion rate to be considered for congestion control. That is, some ports can be so congested that they should not be considered available for selection for load balancing purposes. The combined congestion control and load balancing logic 300 can determine the subset where each egress port of the subset has an E2E congestion rate that satisfies the threshold criterion. The combined congestion control and load balancing logic 300 can select the egress port from the subset that satisfies a scoring criterion relative to the other egress ports of the subset. For example, the scoring criterion can be a lowest score, where the lower scores are better than higher scores. The combined congestion control and load balancing logic 300 can select the egress port with the lowest score in the subset or at least one of the egress ports having a score that is less than scores of others in the subset. In another embodiment, the combined congestion control and load balancing logic 300 can select the egress port from the subset using a selection scheme, such as a randomizing scheme, a round-robin scheme, a last-used scheme, or the like.

Figure 4:
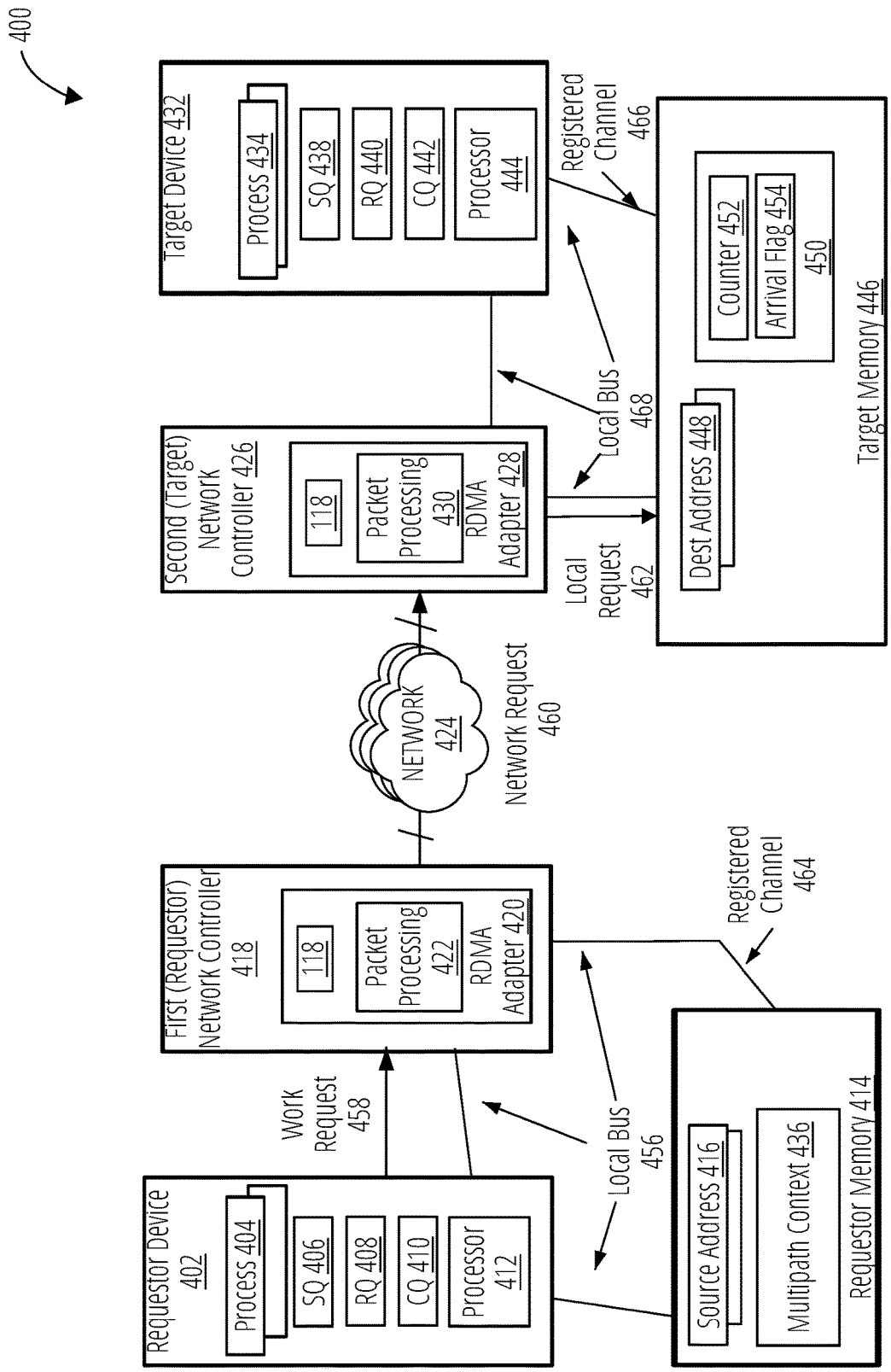
FIG. 4 is a block diagram of an example network architecture capable of spreading a single transport flow across multiple network paths, according to at least one embodiment.

FIG. 4 is a block diagram of an example network architecture 400 capable of spreading a single transport flow across multiple network paths, according to at least one embodiment. As depicted in FIG. 4, network architecture 400 can support operations of a requestor device 402 connected over local bus 456 to a first network controller 418 (a requestor network controller). The first network controller 418 can be connected, via a network 424, to a second network controller 426 (a target network controller) that supports operations of a target device 432. Network 424 can be a public network (e.g., the Internet), a private network (e.g., a local area network (LAN), or a wide area network (WAN)), a wireless network, a personal area network (PAN), or a combination thereof. RDMA operations can support the transfer of data from a requestor memory 414 directly to (or from) a target memory 446 without software mediation by target device 432.

Requestor device 402 can support one or more applications (not explicitly shown in FIG. 4) that can manage various processes 404 that control communication of data with various targets, including target memory 446. To facilitate memory transfers, processes 404 can post work requests (WRs) to a send queue (SQ) 406 and a receive queue (RQ) 408. SQ 406 can be used to request one-sided READ, WRITE, and ATOMIC operations and two-sided SEND operations, while RQ 408 can be used to facilitate two-sided RECEIVE requests. Similar processes 434 can operate on target device 432, supporting its own SQ 438 and RQ 440. A connection between requestor device 402 and target device 432 bundles SQs and RQs into queue pairs (QPs), e.g., SQ 406 (or RQ 408) on requestor device 402 is paired with RQ 440 (or SQ 438) on target device 432. More specifically, to initiate a connection between requestor device 101 and target device 432, the processes 404 and 434 can create and link one or more queue pairs.

To perform a data transfer, process 404 creates a work queue element (WQE) that specifies parameters such as the RDMA verb (operation) to be used for data communication and also can define various operation parameters, such as a source address 416 in a requestor memory 414 (where the data is currently stored), a destination address 448 in a target memory 446, and other parameters, as discussed in more detail below. Requestor device 402 can then put the WQE into SQ 406 and send a WR 458 to the first network controller 418, which can use an RDMA adapter 420 to perform packet processing 422 of the WQE and transmit the data indicated in source address 416 to the second network controller 426 via network 424 using a network request 460. An RDMA adapter 428 can perform packet processing 430 of the received network request 460 (e.g., by generating a local request 462) and store the data at a destination address 448 of target memory 446. Subsequently, target device 432 can signal the completion of the data transfer by placing a completion event into a completion queue (CQ) 410 of requestor device 402, indicating that the WQE has been processed by the receiving side. Target device 432 can also maintain CQ 442 to receive completion messages from requestor device 402 when data transfers happen in the opposite direction, from the target device 432 to requestor device 402.

Operation of requestor device 402 and target device 432 can be supported by respective processors 412 and 444, which can include one or more processing devices, such as CPUs, graphics processing units (GPUs), application-specific integrated circuits (ASICs), field-programmable gate arrays (FPGAs), or any combination thereof. In some embodiments, any of the requestor device 402, the first network controller 418, and/or requestor memory 414 can be implemented using an integrated circuit, e.g., a system-on-chip. Similarly, any of the target device 432, the second network controller 426, and/or target memory 446 can be implemented on a single chip. The requestor device 402 and first network controller 418 can be implemented in a personal computer (PC), a set-top box (STB), a server, a network router, a switch, a bridge, a data processing unit (DPU), a network card, or any device capable of sending packets over multiple network paths to another device.

Processors 412 and 444 can execute instructions from one or more software programs that manage multiple processes 404 and 434, SQs 406 and 438, RQs 408 and 440, CQs 410 and 442, and the like. For example, software program(s) running on requestor device 402 can include host or client processes, a communication stack, and a driver that mediates between requestor device 402 and first network controller 418. The software program(s) can register direct channels of communication with respective memory devices, e.g., RDMA software programs running on requestor device 402 can register a direct channel 464 of communication between the first network controller 418 and requestor memory 414 (and, similarly, a direct channel 466 of communication between the second network controller 426 and target memory 446). Registered channels 464 and 466 can then be used to support direct memory accesses to the respective memory devices. In the course of RDMA operations, the software program(s) can post WRs, repeatedly check for completed WRs, balance workloads among the multiple RDMA operations, balance workload between RDMA operations and non-RDMA operations (e.g., computations and memory accesses), and so on. The requestor device 402 and first network controller 418 can be used implemented in a personal computer (PC), a set-top box (STB), a server, a network router, a switch, a bridge, a data processing unit (DPU), a network card, or any device capable of sending packets over multiple network paths to another device.

RDMA accesses to requestor memory 414 and/or target memory 446 can be performed via network 424, local bus 456 on the requestor side, and bus 468 on the target side and can be enabled by the Converged Ethernet (RoCE) protocol, iWARP protocol, and/or InfiniBand™, TCP, and the like.

As disclosed in more detail below, RDMA accesses can be facilitated using a multipath context 436 for spreading a single transport flow over multiple network paths of the network 424. The multipath context 436 can be stored in requestor memory 414 or in memory, cache, or storage in the first network controller 418. The multipath context 436 can be a hardware context per session group that would maintain a state per configured route to the destination and the flow CC information described herein. Different routes/network paths to the same destination endpoint are defined as sessions in a session group. For example, three network paths to a destination endpoint would have three sessions in a session group. There can be some translation between sessions to a certain destination and the parameters that will be set in the wire protocol headers. After a QP sends a burst of data, it may decide, based on certain parameters, that the next burst will be sent in a different route. When the QP is scheduled again to send a burst, the QP can select one of the routes provided in the multipath context 436 (e.g., hardware multipath context) based on their relative weights, as described in more detail below. While sending traffic on each route, Round Trip Time (RTT) can be measured by a congestion control (CC) algorithm, and those measurements can be used to adjust the weights for the different routes to identify which are more or less congested. RTT is the length of time it takes for a data packet to be sent to a destination, plus the time it takes for an acknowledgment of that packet to be received back at the origin. The multipath context 436 can be used to optimally utilize multiple routes to the same destination. In cases with limited out-of-order support in the hardware, a fence can be used when changing routers which adds an overhead that needs to be considered. No additional changes are needed if full packet reordering is available at the end node. The multipath feature described herein can be set up during session negotiation by a session negotiation mechanism. The multipath feature can be based on ROCE, Software RDMA over Commodity Ethernet (SROCE), InfiniBand over Ethernet (IBoE), or other similar transport technologies.

The first network controller 418 can spread a transport flow across multiple paths in the network 424 while maintaining control at an endpoint using the multipath context 436. The RDMA adapter 420 can improve network utilization by spreading the transport flow across multiple network paths. The first network controller 418 can enable software to load different network routing identifiers for a specific transport flow, and the hardware can use these network routing identifiers while sending traffic to send packets across all of the given network paths at a finer granularity. Network routing identifiers refer to a value that is part of a packet header field (also referred to as a header field in wire protocol headers). The first network controller 418 can enable hardware to send packets with multiple different routing parameters without software intervention in the data path. The first network controller 418 can enable spreading traffic for a single transport flow on multiple routes transparently to the process 404 (e.g., an application). The first network controller 418 can monitor individual routes and identify which routers are more or less congested. The first network controller 418 can provide a fast recovery mechanism in the case of a transport error. The second network controller 426 can similarly perform similar functions.

In at least one embodiment, the requestor device 402 and the first network controller 418 are part of a first node, and the target device 432 and the second network controller 426 are part of a second node. There can be multiple intervening nodes between the first node and the second node. At a minimum, at least two paths should be between the first node and the second node.

Figure 5:
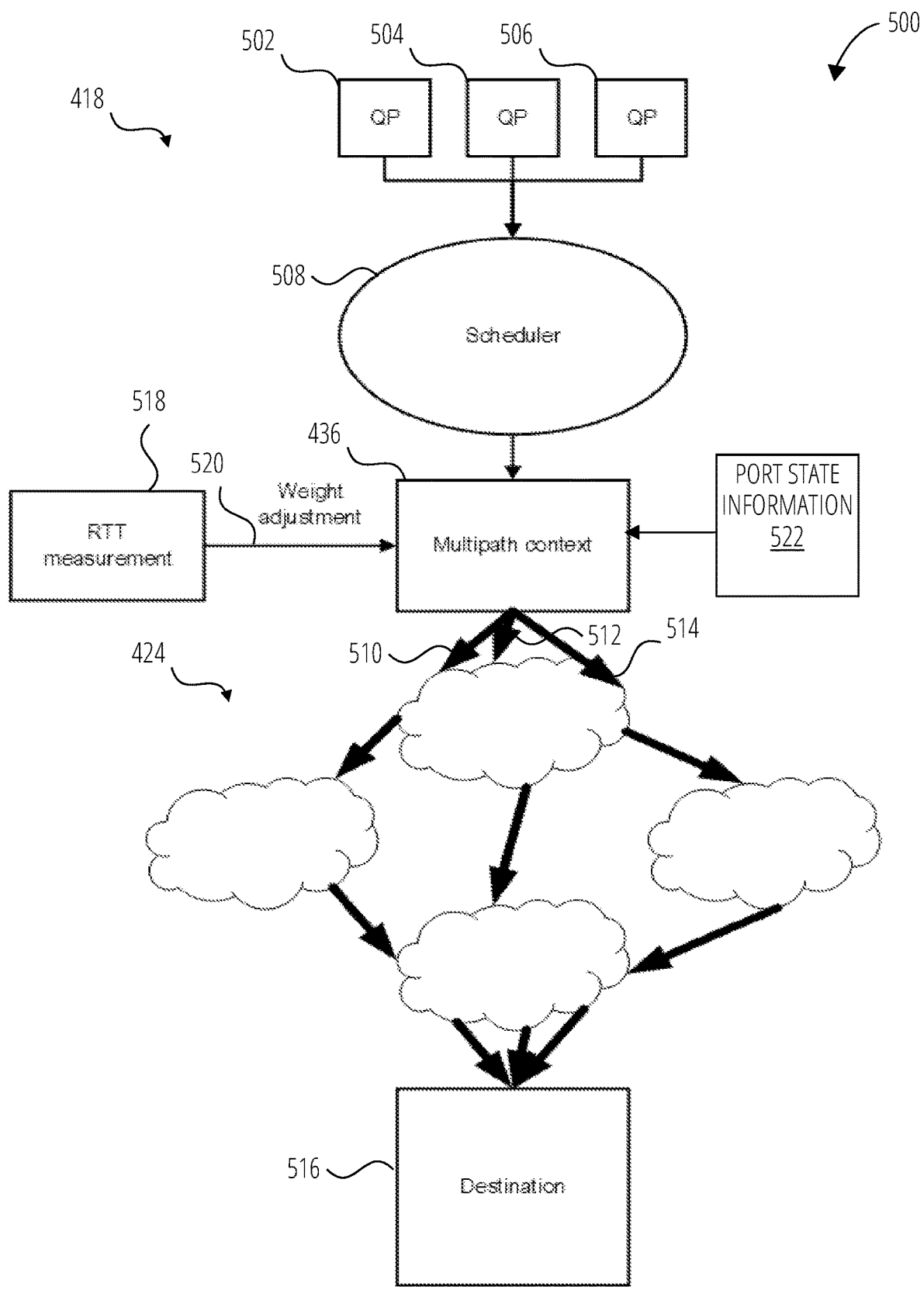
FIG. 5 is a diagram illustrating a scheduling flow that can send bursts on any of the routes through a network to a given destination, according to at least one embodiment.

FIG. 5 is a diagram illustrating a scheduling flow 500 that can send bursts on any of the routes through a network to a given destination, according to at least one embodiment. In the scheduling flow 500, a scheduler 508 can schedule transfers for multiple QPs 502, 504, 506. The scheduler 508 can use the multipath context 436 to spread packets of a single transport flow over multiple network paths 510, 512, 514, of the network 424 to a destination endpoint 516. The network paths 510, 512, 514 are different paths to the same destination endpoint 516. The multipath context 436 can store a state of each network paths 510, 512, 514. The multipath context 436 can store a hardware context for each session group. As illustrated in FIG. 5, there are three network paths 510, 512, 514. The network paths to the same destination endpoint 516 are three sessions in a single session group. The QPs 502, 504, 506 can be multipath QPs that can be assigned to a session group. There will be a hardware multipath context 436 assigned per session group. The multipath context 436 can maintain a weight per session in the session group. The number of sessions per session group is configurable (e.g., 8 sessions per session group would result in at least three bits in the wire protocol headers to identify the respective sessions). For example, the QPs 502, 504, 506, can be part of one session group or separate session groups. In at least one embodiment, the QPs 502, 504, 506 can be part of the same session group associated with the multipath context 436. Other multipath contexts (not illustrated in FIG. 5) can be used for other session groups.

As described above, the multipath context 436 can be a hardware context per session group that would maintain a state per configured route to the destination endpoint 516. For example, after QP 502 sends a burst of data during operation, the scheduler 508 can decide, based on certain parameters, that the next burst sent from the QP 502 will be sent in a different route. When QP 502 is scheduled to send its next burst, the scheduler 508 can select one of the routes provided in the multipath context 436 (e.g., HW context) based on their relative weights. In at least one embodiment, one or more RTT measurements 518 can be fed into the multipath context 436 as weight adjustments 520. In at least one embodiment, the QP 502 includes a congestion control (CC) algorithm that uses the weight adjustment(s) 520 in the multipath context 436 to select one of the network paths 510, 512, 514 that is less congested. The multipath context 436 can also include port state information 522 about each outgoing port. The scheduler 508 can select a best route given the weight adjustment(s) 520 and the port state information 522. The multipath context 436 can be used to optimally utilize the different network paths 510, 512, 514 for sending packets of a transport flow to the same destination endpoint 516.

As described above, different routes to the same destination are defined as sessions in a session group. The multipath QPs 502, 504, 506 can be assigned to a session group. There will be some translation between sessions to a certain destination, and the parameters that will be set in the wire protocol headers. In at least one embodiment, a software process is used to ensure that the multipath context 436 holds the correct sessions that cause switches in the network 424 to route the packets across the different network paths 510, 512, 514. If there are any changes in switch configurations, the software process can update the multipath context 436, and the weight adjustments can be reset.

In at least one embodiment, the first network controller 418 of requestor device 402 assigns a first network routing identifier to one or more packets in a first session of a session group associated with a transport flow directed to the destination endpoint 516. The transport flow uses a network protocol that allows RDMA over an Ethernet network, such as ROCE. The first network routing identifier corresponds to the first network path 510. The first network routing identifier in the one or more packets causes these packets to be routed to the destination endpoint 516 via the first network path 510. The first network controller 418 assigns a second network routing identifier to one or more packets in a second session of the session group associated with the transport flow directed to the destination endpoint 516. The second network routing identifier corresponds to network path 512. The second network routing identifier in the one or more packets causes these packets to be routed to the destination endpoint 516 via the second network path 512. The first network controller 418 assigns a third network routing identifier to one or more packets in a third session of the session group associated with the transport flow directed to the destination endpoint 516. The third network routing identifier corresponds to network path 514. The third network routing identifier in the one or more packets causes these packets to be routed to the destination endpoint 516 via the third network path 514. Additional network routing identifiers can be used if there are additional network paths between the requestor device 402 and the destination endpoint 516. In at least one embodiment, software or firmware can handle defining the network routing identifiers to the different network paths and the network switch configuration. The network routing identifiers can also be referred to as router identifiers or path identifiers.

During operation, the processing logic associated with the QP 502 can select the first network path 510 to send a first burst of packets, such as one or more packets in the first session, to the destination endpoint 516. When the scheduler 508 schedules QP 502 for sending traffic, the first session of one or more packets are sent to the destination endpoint 516. As described above, when one or more packets of the first session are sent across the network 424, the first network routing identifier causes one or more packets to be routed to the destination endpoint 516 via the first network path 510.

After scheduling and sending the first session (i.e., first burst), the processing logic associated with QP 502 can determine whether to change routes (i.e., a different network path) based on one or more parameters. The one or more parameters can include bursts since the last route change, the weight of a current route compared to weights of other routes, port states, a requirement of an input fence, random entropy, or the like. In at least one embodiment, the decision is made at the end of the first burst so that a fence can be added if needed. In some cases, there may be a requirement that does not allow a change in the middle of a message. The processing logic can implement an algorithm to determine when to switch routes. This algorithm may require some flexibility to be used for different use cases. The choice of when to make a route change can be programmable by a manager application.

Assuming the processing logic decides to change routes from the first network path 510, when the scheduler 508 schedules the QP 502 for sending traffic again, the second session of one or more packets is sent to the destination endpoint 516. As described above, when the one or more packets of the second session are sent across the network 424, the second network routing identifier causes the one or more packets to be routed to the destination endpoint 516 via the second network path 512.

After scheduling and sending the second session (i.e., next burst), the processing logic associated with QP 502 can determine whether to change routes (i.e., a different network path) based on one or more parameters as described above. Assuming the processing logic decides to change routes from the second network path 512, when the scheduler 508 schedules the QP 502 for sending traffic again, the third session of one or more packets is sent to the destination endpoint 516. As described above, when the one or more packets of the third session are sent across the network 424, the third network routing identifier causes the one or more packets to be routed to the destination endpoint 516 via the third network path 514.

Using the scheduler 508, the requestor device 402 sends one or more packets of the first session to the destination endpoint 516 via the first network path 510, one or more packets of the second session to the destination endpoint 516 via the second network path 512, and the one or more packets of the third session to the destination endpoint 516 via the third network path 514.

In at least one embodiment, the scheduler 508 can schedule similar sessions of QP 504 and QP 506 to be sent. The scheduler 508 can alternate between QPs 502, 504, and 506 according to a scheduling scheme.

Once the processing logic associated with a QP has decided to change routes upon the next scheduling, a route needs to be chosen for new route selection. The selection of the new route is made at this later time as the relative weights of the different routes may change in the time it takes for the next scheduling of the QP, allowing the most updated values to be used for new route selection. In at least one embodiment, the new route can be selected by a probabilistic function of the weights of the different routes. This method can avoid the case where all the QPs move to the highest-ranked route, which will then be over-congested until the QPs can move to a new route.

In at least one embodiment, a packet header field can be used to identify the route. That is, the packet header field can contain the network routing identifier corresponding to the selected network path. In at least one embodiment, the packet header field can identify a session port. Switches need to be compatible in that they can route based on the network routing identifier in the packet header field. In at least one embodiment, the compatibility at the end node is negotiated to ensure there is support for packet reordering of the packets arriving from different network paths. The main assumption for multipath transport is that by changing the session, the requestor device can select different routes through the network to the same destination. When interoperating with an end node device that does not support packet reordering, the requestor device can ensure that the operations are fenced before a route change. In cases with limited out-of-order support in the hardware, a fence can be used when changing routers which adds an overhead that needs to be considered. No additional changes are needed if full packet reordering is available at the end node. The multipath feature described herein can be set up during session negotiation by a session negotiation mechanism. The multipath feature can be based on ROCE, SROCE, or other similar transport technologies. In SROCE, it is assumed that multiple sessions will be opened for each entity that intends to utilize multiple paths.

As described above, the route weights can be updated to ensure the spreading of packets over multiple routes to the same destination, as described in more detail below with respect to FIG. 6.

Figure 6:
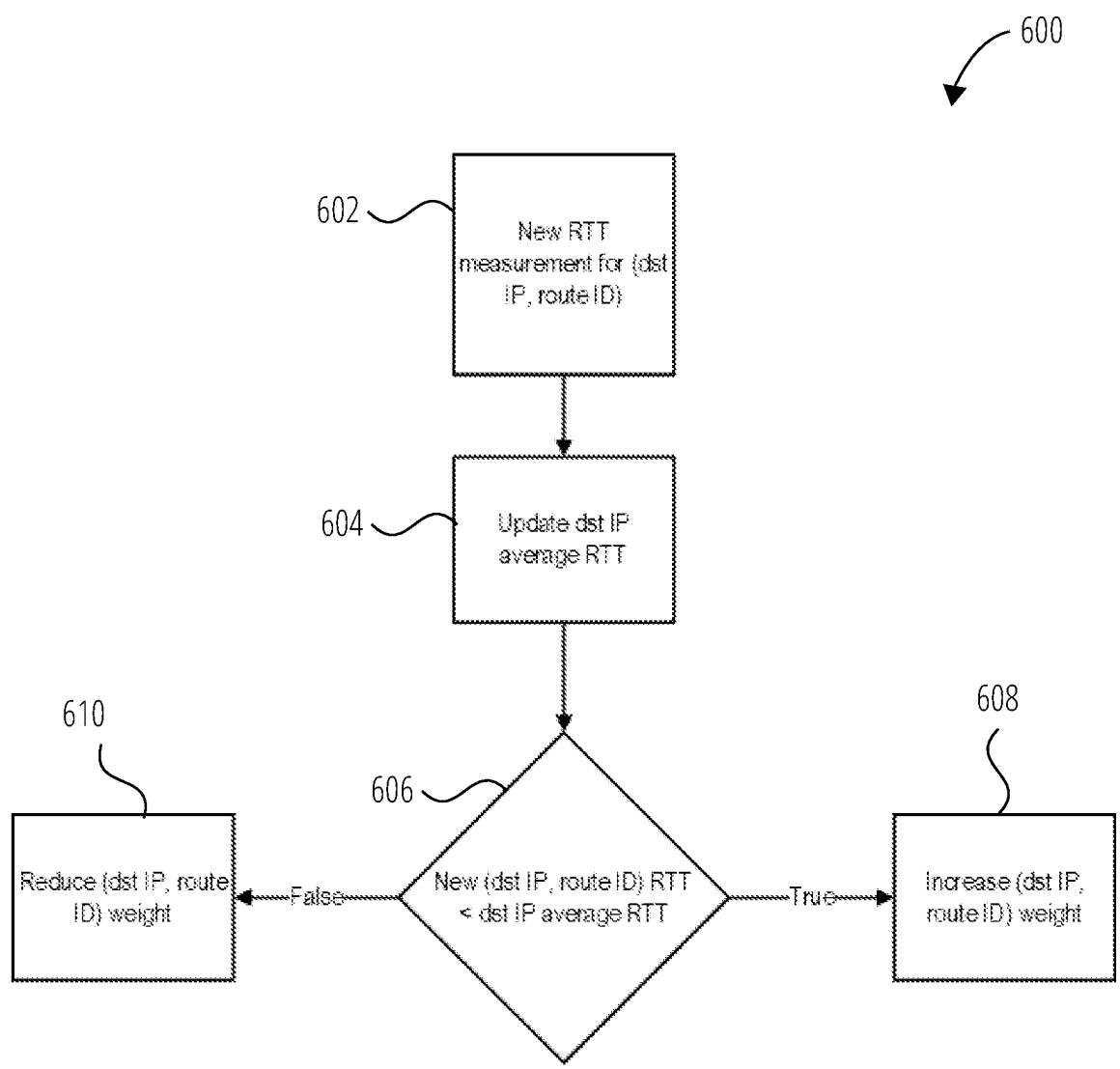
FIG. 6 is a flow diagram of a method for updating route weights according to at least one embodiment.

FIG. 6 is a flow diagram of a method 600 for updating route weights according to at least one embodiment. The method 600 can be performed by processing logic comprising hardware, software, firmware, or any combination thereof. In at least one embodiment, method 600 is performed by the requestor device 402 of FIG. 4. In at least one embodiment, the method 600 is performed by the target device 432 of FIG. 4. In at least one embodiment, the first network controller 418 of FIG. 4 and FIG. 5 performs the method 600. In another embodiment, the method 600 is performed by the second network controller 426 of FIG. 4. In one embodiment, the method 600 can be programmable by users.

Referring to FIG. 6, the method 600 begins with the processing logic determining a new RTT measurement for a network routing identifier (routeID) and destination address (e.g., destination Internet Protocol (IP) address) (block 602). When a burst is sent on a specific route for route weight updating, an RTT measurement packet can be added to constantly check the RTT for each route. To consider the possibility of last hop congestion, which will affect all the routes equally, the weights can be based on the difference from the average RTT for the destination. The processing logic updates an average RTT for the destination address (block 604). The processing logic determines whether the new RTT measurement is less than the average RTT (block 606). If the new RTT measurement is less than the average RTT for the destination, the processing logic increases a weight value for the network routing identifier (destination address, routeID) (block 608). If the new RTT measurement is not less than the average RTT for the destination, the processing logic reduces the weight value for the network routing identifier (destination address, routeID) (block 610).

In another embodiment, during QP connection, the multipath context can be initiated, and the switches can be properly configured to multipath. The multipath can be configurable on a per QP basis. The multipath context allows limited software intervention in the use of multipath, so on the data path itself, there should be no changes.

In at least one embodiment, the hardware multipath context can be controlled by a management process that has control over switch routing. The hardware multipath context can be unavailable to untrusted users. In another embodiment, changing the multipath parameters could be determined by a management interface per network. In some cases, there can be hardware handling, firmware handling, software handling, or any combination thereof. For example, if a route becomes unusable, path measurements will identify this case, which will inform the firmware handling to remove the entry from the multipath context.

Figure 7:
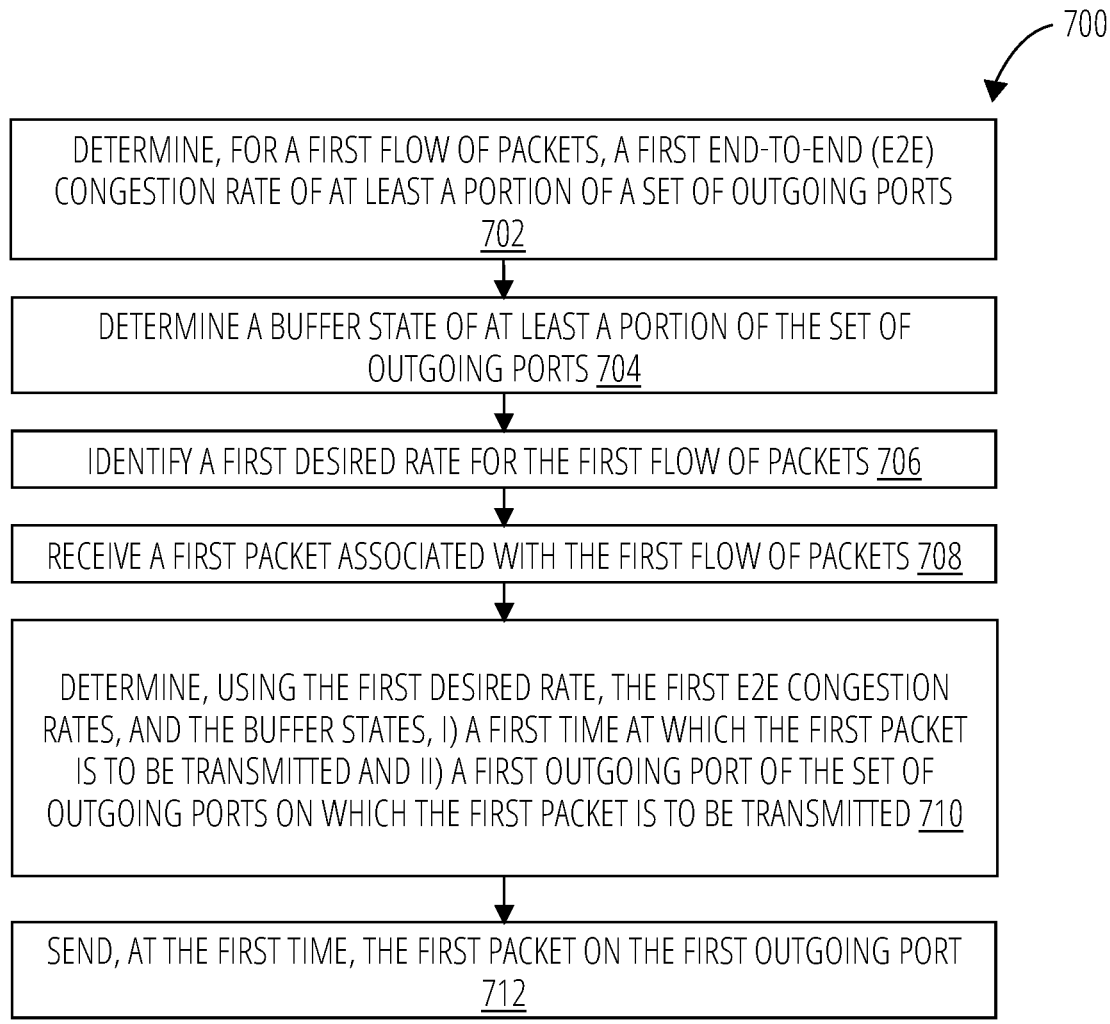
FIG. 7 is a flow diagram of a method for determining an outgoing port for a packet based on E2E congestion rates and port states according to at least one embodiment.

FIG. 7 is a flow diagram of a method 700 for determining an outgoing port for a packet based on E2E congestion rates and port states according to at least one embodiment. The method 700 can be performed by processing logic comprising hardware, software, firmware, or any combination thereof. In at least one embodiment, method 700 is performed by the sender device 102 of FIG. 1. In at least one embodiment, the method 700 is performed by the combined congestion control and load balancing logic 200 of FIG. 2. In at least one embodiment, the method 700 is performed by combined congestion control and load balancing logic 300 of FIG. 3.

Referring to FIG. 7, the method 700 begins with the processing logic determining, for a first flow of packets, a first E2E congestion rate of each of a set of outgoing ports. In block 704, method 700 determines a port state of each of the set of outgoing ports. At block 706, the processing logic identifies a first desired rate for the first flow of packets. At block 708, the processing logic receives a first packet associated with the first flow of packets. At block 710, the processing logic determines, using the first desired rate, the first congestion rates, and the port states, i) a first time at which the first packet is to be transmitted and ii) a first outgoing port of the set of outgoing ports on which the first packet is to be transmitted. At block 712, the processing logic sends, at the first time, the first packet on the first outgoing port.

In a further embodiment, the processing logic determines, for a second flow of packets, a second E2E congestion rate of at least a portion of the set of outgoing ports. The processing logic can identify a second desired rate for the second flow of packets. The processing logic receives a second packet associated with the second flow of packets. The processing logic can determine, using the second desired rate, the second E2E congestion rates, and the port states, i) a second time at which the second packet is to be transmitted and ii) a second outgoing port of the set of outgoing ports on which the second packet is to be transmitted. The processing logic can send, at the second time, the second packet on the second outgoing port.

In a further embodiment, the processing logic determines, for at least a portion of the set of outgoing ports, a score using the respective port state and the respective second E2E congestion rate. The processing logic can determine a subset of the set of outgoing ports, each outgoing port of the subset having a score that satisfies a threshold criterion. The processing logic can determine that the second outgoing port satisfies a scoring criterion relative to the other outgoing ports in the subset of the set of outgoing ports. In some cases, the first and second outgoing ports are the same.

In a further embodiment, the processing logic determines a first score for the first outgoing port using a first state of the first outgoing port and the first E2E congestion rate of the first outgoing port. The processing logic determines a second score for the second outgoing port using a second state of the second outgoing port and the first E2E congestion rate of the second outgoing port. The processing logic can determine that the first and second scores satisfy a threshold criterion. The processing logic can determine that the first score is less than the second score.

In a further embodiment, the processing logic determines, for a second flow of packets, a second E2E congestion rate of at least a portion of the set of outgoing ports. The processing logic can identify a second desired rate for the second flow of packets. The processing logic can receive a second packet associated with the second flow of packets. The processing logic can determine, using the second desired rate, the second E2E congestion rates, and the port states, a second time at which the second packet is to be transmitted. The processing logic can determine a third score for the first outgoing port using the first state of the first outgoing port and the second E2E congestion rate of the first outgoing port. The processing logic can determine a fourth score for the second outgoing port using the second state of the second outgoing port and the second E2E congestion rate of the second outgoing port. The processing logic can determine that the second packet is to be transmitted on the second outgoing port based on the fourth score being less than the third score. The processing logic can send, at the second time, the second packet on the second outgoing port.

In a further embodiment, the processing logic determines, for at least a portion of the set of outgoing ports, a score using the respective port state and the respective first E2E congestion rate. The processing logic can determine a subset of the set of outgoing ports, each outgoing port of the subset having a score that satisfies a threshold criterion. The processing logic can determine that the first outgoing port satisfies a scoring criterion relative to the other outgoing ports in the subset of the set of outgoing ports.

Figure 8A:
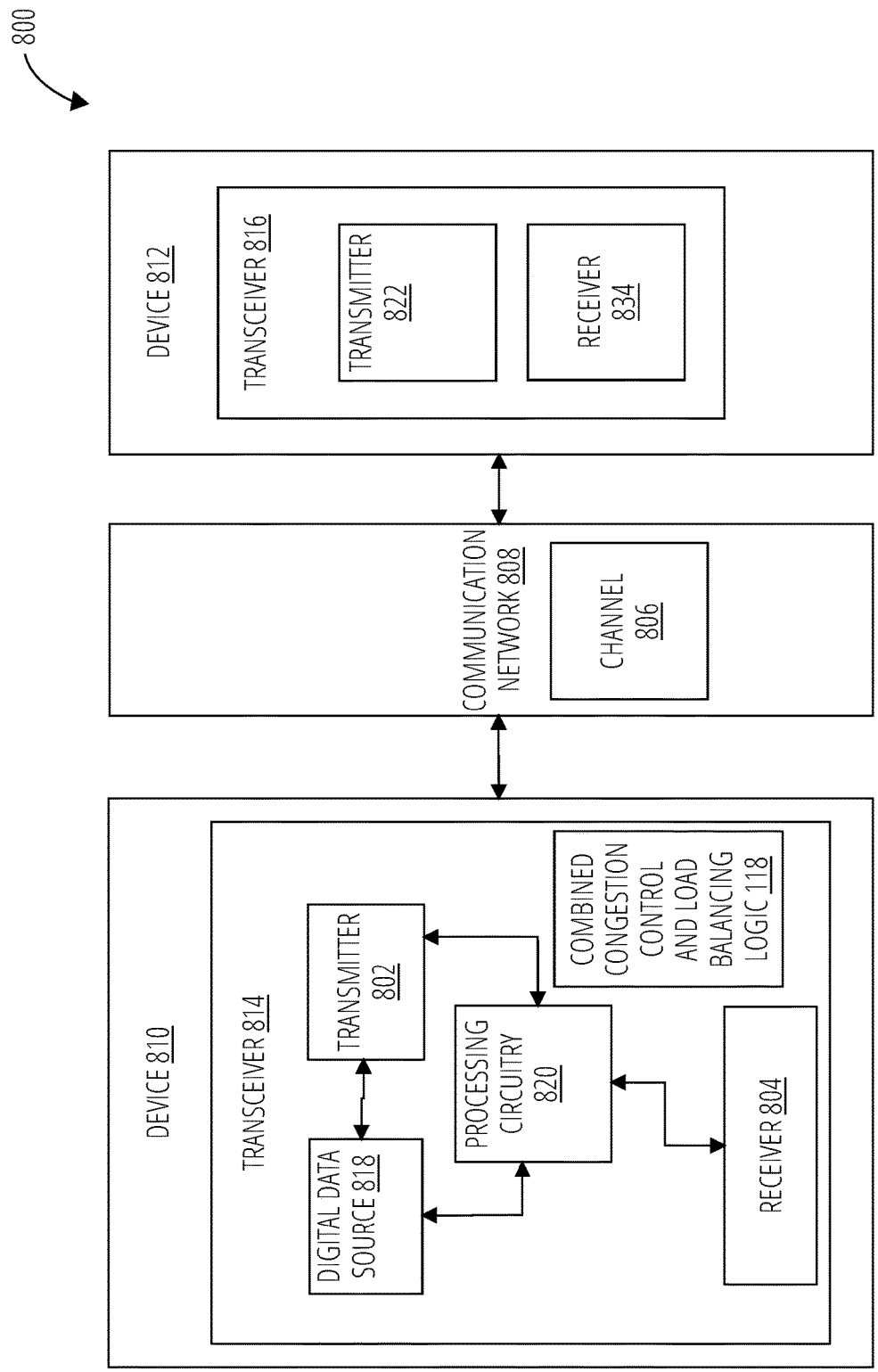
FIG. 8A illustrates an example communication system with combined congestion control and load balancing logic, in accordance with at least some embodiments.

FIG. 8A illustrates an example communication system 800 with combined congestion control and load balancing logic 118, in accordance with at least some embodiments. The communication system 800 includes a device 810, a communication network 808 including a communication channel 806, and a device 812. In at least one embodiment, the devices 810 and 812 are integrated circuits of a Personal Computer (PC), a laptop, a tablet, a smartphone, a server, a collection of servers, or the like. In some embodiments, the devices 810 and 812 may correspond to any appropriate type of device that communicates with other devices also connected to a common type of communication network 808. According to embodiments, the transmitters 802 and 822 of devices 810 or 812 may correspond to transmitters of a GPU, a switch (e.g., a high-speed network switch), a network adapter, a CPU, a data processing unit (DPU), etc.

Examples of the communication network 808 that may be used to connect the devices 810 and 812 include wires, conductive traces, bumps, terminals, or the like. In one specific but non-limiting example, the communication network 808 is a network that enables data transmission between the devices 810 and 812 using data signals (e.g., digital, optical, wireless signals), clock signals, or both.

The device 810 includes a transceiver 814 for sending and receiving signals, for example, data signals. The data signals may be digital or optical signals modulated with data or other suitable signals for carrying data.

The transceiver 814 may include a digital data source 818, a transmitter 802, a receiver 804, and processing circuitry 820 that controls the transceiver 814. The digital data source 818 may include suitable hardware and/or software for outputting data in a digital format (e.g., in binary code and/or thermometer code). The digital data output by the digital data source 818 may be retrieved from memory (not illustrated) or generated according to input (e.g., user input). The transceiver 814 can use the combined congestion control and load balancing logic 118 as described above with respect to FIG. 1 to FIG. 7.

The transceiver 814 includes suitable software and/or hardware for receiving digital data from the digital data source 818 and outputting data signals according to the digital data for transmission over the communication network 808 to a transceiver 816 of device 812.

The receiver 804 of device 810 may include suitable hardware and/or software for receiving signals, for example, data signals from the communication network 808. For example, the receiver 804 may include components for receiving processing signals to extract the data for storing in a memory. In at least one embodiment, the transceiver 816 includes a transmitter 822 and receiver 834. The transceiver 816 receives an incoming signal and samples the incoming signal to generate samples, such as using an analog-to-digital converter (ADC). The ADC can be controlled by a clock-recovery circuit (or clock recovery block) in a closed-loop tracking scheme. The clock-recovery circuit can include a controlled oscillator, such as a voltage-controlled oscillator (VCO) or a digitally-controlled oscillator (DCO) that controls the sampling of the subsequent data by the ADC.

The processing circuitry 820 may comprise software, hardware, or a combination thereof. For example, the processing circuitry 820 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 820 may comprise hardware, such as an ASIC. Other non-limiting examples of the processing circuitry 820 include an Integrated Circuit (IC) chip, a CPU, A GPU, a DPU, a microprocessor, an FPGA, a collection of logic gates or transistors, resistors, capacitors, inductors, diodes, or the like. Some or all of the processing circuitry 820 may be provided on a Printed Circuit Board (PCB) or collection of PCBs. It should be appreciated that any appropriate type of electrical component or collection of electrical components may be suitable for inclusion in the processing circuitry 820. The processing circuitry 820 may send and/or receive signals to and/or from other elements of the transceiver 814 to control the overall operation of the transceiver 814.

The transceiver 814 or selected elements of the transceiver 814 may take the form of a pluggable card or controller for the device 810. For example, the transceiver 814 or selected elements of the transceiver 814 may be implemented on a network interface card (NIC).

The device 812 may include a transceiver 816 for sending and receiving signals, for example, data signals over a channel 806 of the communication network 808. The same or similar structure of the transceiver 814 may be applied to transceiver 816, and thus, the structure of transceiver 816 is not described separately.

Although not explicitly shown, it should be appreciated that devices 810 and 812 and the transceiver 814 and transceiver 816 may include other processing devices, storage devices, and/or communication interfaces generally associated with computing tasks, such as sending and receiving data.

Figure 8B:
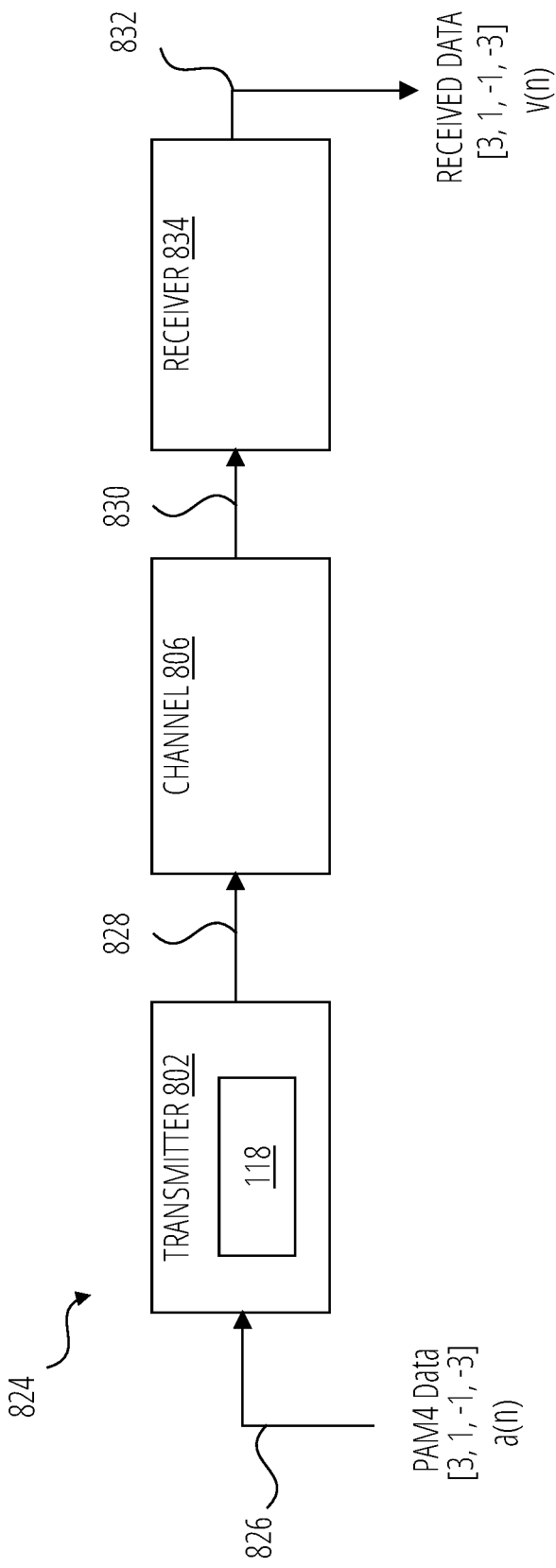
FIG. 8B illustrates a block diagram of an example communication system employing a transmitter with combined congestion control and load balancing logic, according to at least one embodiment.

FIG. 8B illustrates a block diagram of an example communication system 824 employing a transmitter 802 with combined congestion control and load balancing logic 118, according to at least one embodiment. In the example shown in FIG. 8B, a Pulse Amplitude Modulation level-4 (PAM4) modulation scheme is employed with respect to the transmission of a signal (e.g., digitally encoded data) from a transmitter (TX) 802 to a receiver (RX) 834 via a communication channel 806 (e.g., a transmission medium). In this example, the transmitter 802 receives an input data 826 (i.e., the input data at time n is represented as "a(n)"), which is modulated in accordance with a modulation scheme (e.g., PAM4) and sends the signal 828 a(n) including a set of data symbols (e.g., symbols −3, −1, 1, 3, where the symbols represent coded binary data). It is noted that while the use of the PAM4 modulation scheme is described herein by way of example, other data modulation schemes can be used in accordance with embodiments of the present disclosure, including for example, a non-return-to-zero (NRZ) modulation scheme, PAM7, PAM8, PAM16, etc. For example, for an NRZ-based system, the transmitted data symbols consist of symbols −1 and 1, with each symbol value representing a binary bit. This is also known as a PAM level-2 or PAM2 system, as there are 2 unique values of transmitted symbols. Typically, a binary bit 0 is encoded as −1, and a bit 1 is encoded as 1 as the PAM2 values.

In the example shown, the PAM4 modulation scheme uses four (4) unique values of transmitted symbols to achieve higher efficiency and performance. The four levels are denoted by symbol values −3, −1, 1, 3, with each symbol representing a corresponding unique combination of binary bits (e.g., 00, 01, 10, 11).

The communication channel 806 is a destructive medium in that the channel acts as a low pass filter that attenuates higher frequencies more than it attenuates lower frequencies, introduces inter-symbol interference (ISI) and noise from crosstalk, power supplies, Electromagnetic Interference (EMI), or other sources. The communication channel 806 can be over serial links (e.g., a cable, PCB traces, copper cables, optical fibers, or the like), read channels for data storage (e.g., hard disk, flash solid-state drives (SSDs), high-speed serial links, deep space satellite communication channels, applications, or the like. The receiver (RX) 834 receives an incoming signal 830 over the channel 806. The receiver 834 can output a received signal 832, "v(n)," including the set of data symbols (e.g., symbols −3, −1, 1, 3, wherein the symbols represent coded binary data).

In at least one embodiment, the transmitter 802 can be part of a SerDes IC. The SerDes IC can be a transceiver that converts parallel data to serial data and vice versa. The SerDes IC can facilitate transmission between two devices over serial streams, reducing the number of data paths, wires/traces, terminals, etc. The receiver 834 can be part of a SerDes IC. The SerDes IC can include a clock-recovery circuit. The clock-recovery circuit can be coupled to an ADC and an equalization block. In another embodiment, the SerDes IC can include an additional equalization block before a symbol detector.

Figure 9:
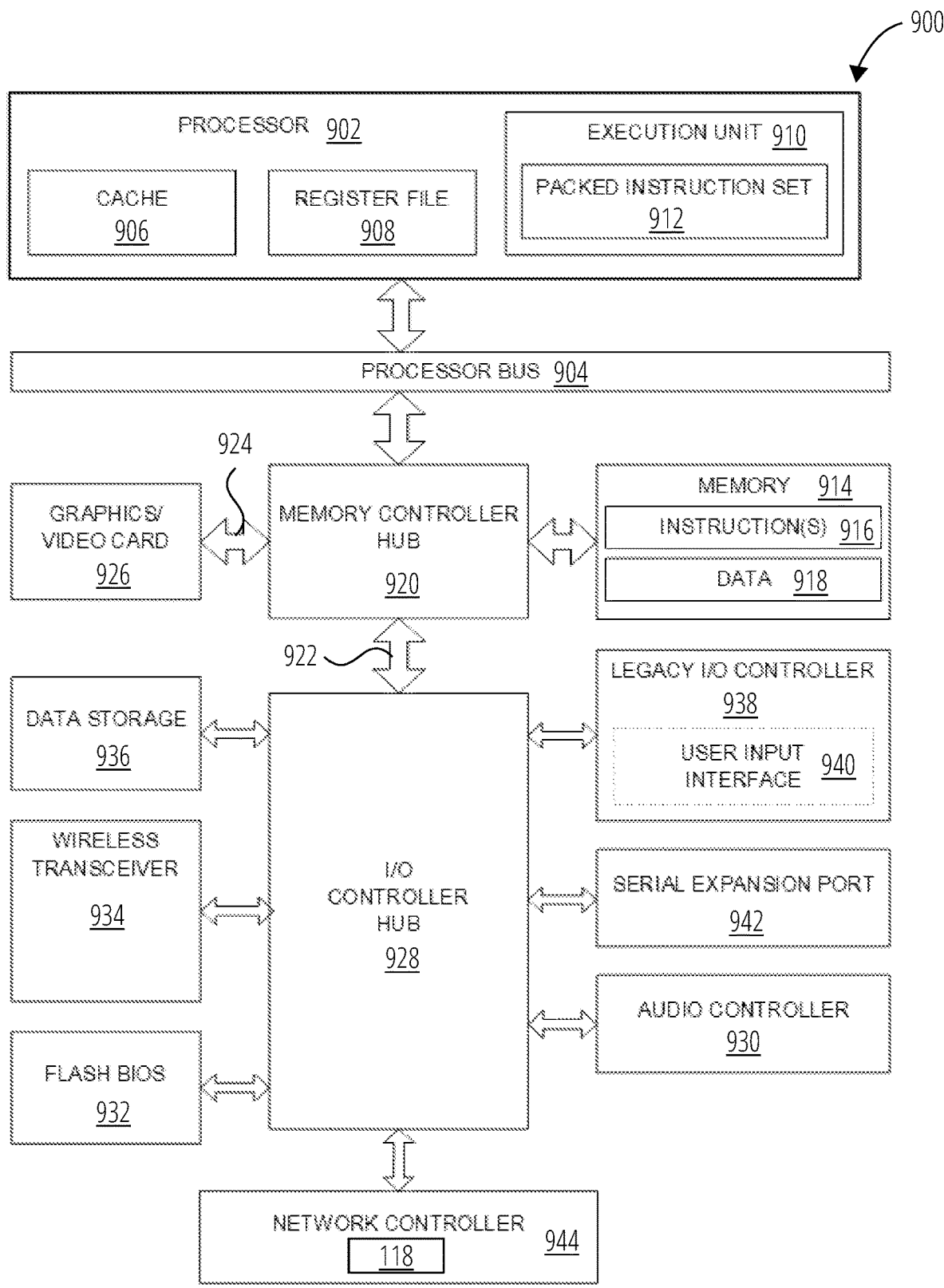
FIG. 9 illustrates an example computer system, including a network controller with a combined congestion control and load balancing logic, in accordance with at least some embodiments.

FIG. 9 illustrates an example computer system 900, including a network controller 944 with a combined congestion control and load balancing logic 118, in accordance with at least some embodiments. The combined congestion control and load balancing logic 118 is used to send packets of a single transport flow over multiple network paths to the same destination, as described herein. In at least one embodiment, computer system 900 may be a system with interconnected devices and components, a System on Chip (SoC), or some combination. In at least one embodiment, computer system 900 is formed with a processor 902 that may include execution units to execute an instruction. In at least one embodiment, computer system 900 may include, without limitation, a component, such as a processor 902, to employ execution units including logic to perform algorithms for processing data. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux, for example), embedded software, and/or graphical user interfaces, may also be used.

In at least one embodiment, computer system 900 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 900 may be used in devices such as graphics processing units (GPUs), network adapters, central processing units, and network devices such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 900 may include, without limitation, processor 902 that may include, without limitation, one or more execution units 807 that may be configured to execute a Compute Unified Device Architecture ("CUDA") (CUDA® is developed by NVIDIA Corporation of Santa Clara, California) program. In at least one embodiment, a CUDA program is at least a portion of a software application written in a CUDA programming language. In at least one embodiment, computer system 900 is a single-processor desktop or server system. In at least one embodiment, computer system 900 may be a multiprocessor system. In at least one embodiment, processor 902 may include, without limitation, a complex instruction set computer (CISC) microprocessor, a reduced instruction set computer (RISC) microprocessor, a Very Long Instruction Word (VLIW) microprocessor, and a processor implementing a combination of instruction sets, or any other processor device, such as a digital signal processor, for example. In at least one embodiment, processor 902 may be coupled to a processor bus 904 that may transmit data signals between processor 902 and other components in computer system 900.

In at least one embodiment, processor 902 may include, without limitation, a Level 1 ("L1") internal cache memory ("cache") 906. In at least one embodiment, processor 902 may have a single internal cache or multiple levels of internal cache. In at least one embodiment, cache memory may reside external to processor 902. In at least one embodiment, processor 902 may also include a combination of both internal and external caches. In at least one embodiment, a register file 908 may store different types of data in various registers including, without limitation, integer registers, floating point registers, status registers, and instruction pointer registers.

In at least one embodiment, execution unit 910, including, without limitation, logic to perform integer and floating point operations, also resides in processor 902. Processor 902 may also include a microcode ("ucode") read-only memory ("ROM") that stores microcode for certain macro instructions. In at least one embodiment, execution unit 910 may include logic to handle a packed instruction set 912. In at least one embodiment, by including packed instruction set 912 in an instruction set of a general-purpose processor 902, along with associated circuitry to execute instructions, operations used by many multimedia applications may be performed using packed data in a general-purpose processor 902. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 910 may also be used in microcontrollers, embedded processors, graphics devices, DSPs, and other types of logic circuits. In at least one embodiment, computer system 900 may include, without limitation, a memory 914. In at least one embodiment, memory 914 may be implemented as a Dynamic Random Access Memory (DRAM) device, a Static Random Access Memory (SRAM) device, a flash memory device, or other memory devices. Memory 914 may store instruction(s) 916 and/or data 918 represented by data signals that may be executed by processor 902.

In at least one embodiment, a system logic chip may be coupled to a processor bus 904 and memory 914. In at least one embodiment, the system logic chip may include, without limitation, a memory controller hub ("MCH") 920, and processor 902 may communicate with MCH 920 via processor bus 904. In at least one embodiment, MCH 920 may provide a high bandwidth memory path to memory 914 for instruction and data storage and for storage of graphics commands, data, and textures. In at least one embodiment, MCH 920 may direct data signals between processor 902, memory 914, and other components in computer system 900 and may bridge data signals between processor bus 904, memory 914, and a system I/O 922. In at least one embodiment, a system logic chip may provide a graphics port for coupling to a graphics controller. In at least one embodiment, MCH 920 may be coupled to memory 914 through a high bandwidth memory path, and graphics/video card 926 may be coupled to MCH 920 through an Accelerated Graphics Port ("AGP") interconnect 924.

In at least one embodiment, computer system 900 may use system I/O 922 that is a proprietary hub interface bus to couple MCH 920 to I/O controller hub ("ICH") 928. In at least one embodiment, ICH 928 may provide direct connections to some I/O devices via a local I/O bus. In at least one embodiment, a local I/O bus may include, without limitation, a high-speed I/O bus for connecting peripherals to memory 914, a chipset, and a processor 902. Examples may include, without limitation, an audio controller 930, a firmware hub ("flash BIOS") 932, a wireless transceiver 934, a data storage 936, a legacy I/O controller 938 containing a user input interface 940, a keyboard interface, a serial expansion port 942, such as a USB port, and a network controller 644, including the combined congestion control and load balancing logic 118 as described herein. Data storage 936 may comprise a hard disk drive, a floppy disk drive, a CD-ROM device, a flash memory device, or other mass storage devices.

In at least one embodiment, FIG. 9 illustrates a computer system 90000, which includes interconnected hardware devices or "chips." In at least one embodiment, FIG. 9 may illustrate an example SoC. In at least one embodiment, devices illustrated in FIG. 9 may be interconnected with proprietary interconnects, standardized interconnects (e.g., Peripheral Component Interconnect Express (PCIe), or some combination thereof. In at least one embodiment, one or more components of computer system 900 are interconnected using compute express link ("CXL") interconnects.

Other variations are within spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B or C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lack all of the code, while multiple non-transitory computer-readable storage media collectively store all of the code. In at least one embodiment, executable instructions are executed such that different processors execute different instructions.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled," "operatively coupled," and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still cooperate or interact with each other.

Unless specifically stated otherwise, it may be appreciated that throughout specification terms such as "processing," "computing," "calculating," "determining," or like, refer to actions and/or processes of a computer or computing system or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As a non-limiting example, a "processor" may be a network device. A "computing platform" may comprise one or more processors. As used herein, "software" processes may include, for example, software and/or hardware entities that perform work over time, such as tasks, threads, and intelligent agents. Also, each process may refer to multiple processes for continuously or intermittently carrying out instructions in sequence or parallel. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality and are intended to be within the scope of this disclosure. Furthermore, although specific distributions of responsibilities may be defined above for purposes of description, various functions and responsibilities might be distributed and divided in different ways, depending on the circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A device comprising:
a plurality of outgoing ports; and
a network adapter coupled to the plurality of outgoing ports, wherein the network adapter is to:
send a plurality of packets to one or more other devices on the plurality of outgoing ports;
measure, using acknowledgements of at least some of the plurality of packets, round trip times (RTTs) for the plurality of packets;
determine, for a first flow of packets using the RTTs, a first end-to-end (E2E) congestion rate of at least a portion of the plurality of outgoing ports;
measure one or more local metrics of one or more hardware resources associated with each of the plurality of outgoing ports;
determine, using the one or more local metrics, a port congestion level of at least a portion of the plurality of outgoing ports;
identify a first desired rate for the first flow of packets;
receive a first packet associated with the first flow of packets;
determine, using the first desired rate, the first E2E congestion rates, and the port congestion levels, i) a first time at which the first packet is to be transmitted and ii) a first outgoing port of the plurality of outgoing ports on which the first packet is to be transmitted; and
send, at the first time, the first packet on the first outgoing port.

2. The device of claim 1, wherein the network adapter is further to:
determine, for at least a portion of the plurality of outgoing ports, a score using the respective port congestion level and the respective first E2E congestion rate;
determine a subset of the plurality of outgoing ports, each outgoing port of the subset having a score that satisfies a threshold criterion; and
determine that the first outgoing port satisfies a scoring criterion relative to the other outgoing ports in the subset of the plurality of outgoing ports.

3. The device of claim 1, wherein the network adapter is further to:
determine, for a second flow of packets, a second E2E congestion rate of at least a portion of the plurality of outgoing ports;
identify a second desired rate for the second flow of packets;
receive a second packet associated with the second flow of packets;
determine, using the second desired rate, the second E2E congestion rates, and the port congestion levels, i) a second time at which the second packet is to be transmitted and ii) a second outgoing port of the plurality of outgoing ports on which the second packet is to be transmitted; and
send, at the second time, the second packet on the second outgoing port.

4. The device of claim 3, wherein the first outgoing port and the second outgoing port are the same.

5. The device of claim 3, wherein the network adapter is further to:
determine, for at least a portion of the plurality of outgoing ports, a score using the respective port congestion level and the respective second E2E congestion rate;
determine a subset of the plurality of outgoing ports, each outgoing port of the subset having a score that satisfies a threshold criterion; and
determine that the second outgoing port satisfies a scoring criterion relative to the other outgoing ports in the subset of the plurality of outgoing ports.

6. The device of claim 1, wherein, to determine i) the first time and ii) the first outgoing port, the network adapter is further to:
determine a first score for the first outgoing port using a first congestion level of the first outgoing port and the first E2E congestion rate of the first outgoing port;
determine a second score for a second outgoing port using a second congestion level of the second outgoing port and a second E2E congestion rate of the second outgoing port;
determine that the first score and the second score each satisfy a threshold criterion; and
determine that the first score is less than the second score.

7. The device of claim 6, wherein the network adapter is further to:
determine, for a second flow of packets, a second E2E congestion rate of at least a portion of the plurality of outgoing ports;
identify a second desired rate for the second flow of packets;
receive a second packet associated with the second flow of packets;
determine, using the second desired rate, the second E2E congestion rates, and the port congestion levels, a second time at which the second packet is to be transmitted;
determine a third score for the first outgoing port using the first congestion level of the first outgoing port and the second E2E congestion rate of the first outgoing port;
determine a fourth score for the second outgoing port using the second congestion level of the second outgoing port and the second E2E congestion rate of the second outgoing port;
determine the second packet is to be transmitted on the second outgoing port based on the fourth score being less than the third score; and
send, at the second time, the second packet on the second outgoing port.

8. The device of claim 1, wherein the one or more local metrics comprises at least one of:
a number of outstanding packets in one or more allocated buffers associated with the corresponding outgoing port;
a transmission rate of the corresponding outgoing port over a period;
a number of the one or more allocated buffers associated with the corresponding outgoing port; or
a congestion level of the one or more allocated buffers associated with the corresponding outgoing port.

9. The device of claim 1, wherein the network adapter is further to receive the first desired rate from a congestion control algorithm.

10. A method of operating a network adapter, the method comprising:
sending a plurality of packets to one or more other devices on a plurality of outgoing ports;
measuring, using acknowledgements of at least some of the plurality of packets, round trip times (RTTs) for the plurality of packets;
determining, for a first flow of packets using the RTTs, a first end-to-end (E2E) congestion rate of at least a portion of the plurality of outgoing ports;
measuring one or more local metrics of one or more hardware resources associated with each of the plurality of outgoing ports;
determining, using the one or more local metrics, a port congestion level of at least a portion of the plurality of outgoing ports;
identifying a first desired rate for the first flow of packets;
receiving a first packet associated with the first flow of packets;
determining, using the first desired rate, the first E2E congestion rates, and the port congestion levels, i) a first time at which the first packet is to be transmitted and ii) a first outgoing port of the plurality of outgoing ports on which the first packet is to be transmitted; and
sending, at the first time, the first packet on the first outgoing port.

11. The method of claim 10, further comprising:
determining, for a second flow of packets, a second E2E congestion rate of at least a portion of the plurality of outgoing ports;
identifying a second desired rate for the second flow of packets;
receiving a second packet associated with the second flow of packets;
determining, using the second desired rate, the second E2E congestion rates, and the port congestion levels, i) a second time at which the second packet is to be transmitted and ii) a second outgoing port of the plurality of outgoing ports on which the second packet is to be transmitted; and
sending, at the second time, the second packet on the second outgoing port.

12. The method of claim 11, further comprising:
determining, for at least a portion of the plurality of outgoing ports, a score using the respective port congestion level and the respective second E2E congestion rate;
determining a subset of the plurality of outgoing ports, each outgoing port of the subset having a score that satisfies a threshold criterion; and
determining that the second outgoing port satisfies a scoring criterion relative to the other outgoing ports in the subset of the plurality of outgoing ports.

13. The method of claim 11, wherein the first outgoing port and the second outgoing port are the same.

14. The method of claim 10, wherein determining i) the first time and ii) the first outgoing port comprises:
determining a first score for the first outgoing port using a first congestion level of the first outgoing port and the first E2E congestion rate of the first outgoing port;

determining a second score for the second outgoing port using a second congestion level of the second outgoing port and the first E2E congestion rate of the second outgoing port;

determining that the first score and the second score each satisfy a threshold criterion; and determining that the first score is less than the second score.

15. The method of claim 14, further comprising:

determining, for a second flow of packets, a second E2E congestion rate of at least a portion of the plurality of outgoing ports;

identifying a second desired rate for the second flow of packets;

receiving a second packet associated with the second flow of packets;

determining, using the second desired rate, the second E2E congestion rates, and the port congestion levels, a second time at which the second packet is to be transmitted;

determining a third score for the first outgoing port using the first congestion level of the first outgoing port and the second E2E congestion rate of the first outgoing port;

determining a fourth score for the second outgoing port using the second congestion level of the second outgoing port and the second E2E congestion rate of the second outgoing port;

determining the second packet is to be transmitted on the second outgoing port based on the fourth score being less than the third score; and sending, at the second time, the second packet on the second outgoing port.

16. The method of claim 14, further comprising:

determining, for at least a portion of the plurality of outgoing ports, a score using the respective port congestion level and the respective first E2E congestion rate;

determining a subset of the plurality of outgoing ports, each outgoing port of the subset having a score that satisfies a threshold criterion; and determining that the first outgoing port satisfies a scoring criterion relative to the other outgoing ports in the subset of the plurality of outgoing ports.

17. A system comprising:

a memory;

a processor operatively coupled to the memory; and a network adapter operatively coupled to the processor, wherein the network adapter is to:

send a plurality of packets to one or more other devices on the plurality of outgoing ports;

measure, using acknowledgements of at least some of the plurality of packets, round trip times (RTTs) for the plurality of packets;

determine, for a first flow of packets, a first end-to-end (E2E) congestion rate of at least a portion of the plurality of outgoing ports;

measure one or more local metrics of one or more hardware resources associated with each of the plurality of outgoing ports;

determine, using the one or more local metrics, a port congestion level of at least a portion of the plurality of outgoing ports;

identify a first desired rate for the first flow of packets;

receive a first packet associated with the first flow of packets;

determine, using the first desired rate, the first E2E congestion rates, and the port congestion levels, i) a first time at which the first packet is to be transmitted and ii) a first outgoing port of the plurality of outgoing ports on which the first packet is to be transmitted; and send, at the first time, the first packet on the first outgoing port.

18. The system of claim 17, wherein the network adapter is further to:

determine, for a second flow of packets, a second E2E congestion rate of at least a portion of the plurality of outgoing ports;

identify a second desired rate for the second flow of packets;

receive a second packet associated with the second flow of packets;

determine, using the second desired rate, the second E2E congestion rates, and the port congestion levels, i) a second time at which the second packet is to be transmitted and ii) a second outgoing port of the plurality of outgoing ports on which the second packet is to be transmitted; and send, at the second time, the second packet on the second outgoing port.

19. The system of claim 18, wherein the network adapter is further to:

determine, for at least a portion of the plurality of outgoing ports, a score using the respective port congestion level and the respective second E2E congestion rate;

determine a subset of the plurality of outgoing ports, each outgoing port of the subset having a score that satisfies a threshold criterion; and determine that the second outgoing port satisfies a scoring criterion relative to the other outgoing ports in the subset of the plurality of outgoing ports.

20. The system of claim 17, wherein the network adapter is further to:

determine, for at least a portion of the plurality of outgoing ports, a score using the respective port congestion level and the respective first E2E congestion rate;

determine a subset of the plurality of outgoing ports, each outgoing port of the subset having a score that satisfies a threshold criterion; and determine that the first outgoing port satisfies a scoring criterion relative to the other outgoing ports in the subset of the plurality of outgoing ports.

\* \* \* \* \*